(12) United States Patent
Jozawa et al.

(10) Patent No.: US 6,785,331 B1
(45) Date of Patent: Aug. 31, 2004

(54) PREDICTIVE ENCODING AND DECODING METHODS OF VIDEO DATA

(75) Inventors: Hirohisa Jozawa, Tokyo (JP); Atsushi Shimizu, Tokyo (JP); Kazuto Kamikura, Tokyo (JP); Hiroshi Watanabe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/355,362

(22) PCT Filed: Jan. 27, 1998

(86) PCT No.: PCT/JP98/00305

§ 371 (c)(1),
(2), (4) Date: Jul. 28, 1999

(87) PCT Pub. No.: WO98/36577

PCT Pub. Date: Aug. 20, 1998

(30) Foreign Application Priority Data

Feb. 14, 1997 (JP) .............................................. 9-030367

(51) Int. Cl.$^7$ ................................................ H04N 7/12
(52) U.S. Cl. ............. 375/240.12; 375/240; 375/240.16; 375/240.17; 375/240.13; 375/240.15
(58) Field of Search ........................... 375/240, 240.12, 375/240.16, 240.17, 240.15, 240.13; 382/236

(56) References Cited

U.S. PATENT DOCUMENTS

| 5,557,330 A | | 9/1996 | Astle ........................ 348/394.1 |
| 5,657,087 A | | 8/1997 | Jeong et al. |
| 5,764,803 A | * | 6/1998 | Jacquin et al. ............... 382/236 |
| 6,008,852 A | * | 12/1999 | Nakaya .................. 375/240.16 |
| 6,222,882 B1 | * | 4/2001 | Lee et al. ............... 375/240.16 |

FOREIGN PATENT DOCUMENTS

| EP | 0456433 | 11/1991 | |
| EP | 0 689 359 A2 | * 12/1995 | ............ H04N/7/50 |
| EP | 08140098 | 5/1996 | |
| JP | 2171093 | 7/1990 | |

OTHER PUBLICATIONS

K. Kamikura, et al., "Global Motion Compensation Method in Video Coding", *Proceedings of IEICE*, B–I, vol. J76–B–I, No. 12, pp. 944–953, Dec., 1993.
H. Jozawa, et al., "Two–Stage Motion Compensation Using Adaptive Global MC and Local Affine MC", *IEEE Transactions on Circuits and Systems for Video Technology*, vol. 7, No. 1, pp. 75–85, Feb., 1997.
K. Kamikura, et al., "Video Coding for Digital Storage Media Using Hierarchical Intraframe Scheme", Proceedings reprinted from "Visual Communications and Image Processing '90", 5$^{th}$ in a series, *SPIE (The International Society for Optical Engineering)*, vol. 1360, pp. 1540–1550, 1990.
H. Jozawa, et al., "Core Experiment on Global Motion Compensation (P1) Version 5.0", *Description of Core Experiments on Efficient coding in MPEG-4 Video*, pp. 1–18, Dec. 1996.
XP 002047798, "Video Object Plane."
XP–002090865, "Combined Motion Shape Texture Coding," MPEG4 Video Verification Model.

* cited by examiner

*Primary Examiner*—Chris Kelley
*Assistant Examiner*—Allen Wong
(74) *Attorney, Agent, or Firm*—Thelen Reid & Priest LLP

(57) ABSTRACT

Video data predictive encoding methods using the two kinds of prediction modes, the global and local motion compensation modes, are provided, by which unnecessary MCSEL is reduced as much as possible, and the data compression efficiency is improved. In the encoder, after a code word MCBPC indicating the macroblock type and presence/absence of the DCT coefficient of each of two blocks for sending color-difference signals, a code word MCSEL indicating which motion-compensating mode, global or local, was adopted for the prediction of the current macroblock is output if the macroblock was not intraframe-encoded.

5 Claims, 22 Drawing Sheets

PREDICTIVE ENCODING AND DECODING METHODS OF VIDEO DATA

TECHNICAL FIELD

The present invention relates to methods for encoding and decoding signals of video data (i.e., moving pictures).

BACKGROUND ART

In existing video data coding standards such as ITU-T H.261, H. 263, ISO/IEC 11172-2 (MPEG-1), and ISO/IEC 13818-2 (MPEG-2), a motion-compensated interframe prediction method is adopted for reducing temporal redundancy with respect to video data. Also in an example model based on the ISO/IEC14496-2 (MPEG-4) standard which is currently being studied, a similar motion compensating method is adopted.

Generally in motion-compensated predictive coding methods, (i) a frame to be encoded (i.e., the current frame) is divided into rectangular blocks, called "macroblocks", having 16 pixels×16 lines, (ii) a relative amount of the motion (i.e., a motion vector having horizontal component $t_x$ and vertical component $t_y$ of displacement) with respect to a reference frame is detected for each macroblock, and (iii) an interframe difference between a predicted frame and the current frame is encoded, where the predicted frame is obtained in a manner such that the block of the reference frame corresponding to the relevant macroblock of the current frame is shifted by the motion vector.

More specifically, predicted image data (in the reference frame) which most matches the image data at point (x, y) of the current frame is represented by using coordinates (x', y') and the above motion vector ($t_x$, $t_y$) as follows.

$$x'=x+t_x$$
$$y'=y+t_y$$

That is, the pixel value at the same point (x, y) of the reference frame is not directly used, but the pixel value at a point obtained by shifting the point (x, y) by the motion vector ($t_x$, $t_y$) is determined as the predicted value, thereby remarkably improving the efficiency of the interframe prediction.

On the other hand, a global motion compensation method has been proposed, in which motions of the whole picture caused by a camera motion such as panning, tilting, or zooming are predicted (refer to H. Jozawa, et al., "Core Experiment on Global Motion Compensation (P1) Version 5.0", Description of Core Experiments on Efficient Coding in MPEG-4 Video, pp. 1–17, December, 1996). Below, the general structure and operation flow of the encoder and decoder used for the global motion compensation will be explained with reference to FIGS. 3 and 4.

First, frame (data) 1 to be encoded (i.e., input frame 1) and reference frame (data) 3 are input into global motion estimator 4, where global motion parameters 5 relating to the whole frame are determined. Projective transformations, bilinear transformations, or affine transformations can be used as a motion model in this system. The method disclosed by Jozawa et al. can be applied to any motion model so that the kind of motion model is unlimited; however, the general functions of the representative motion models as described above will be explained below.

With any point (x, y) of the current frame and corresponding predicted point (x', y') of the reference frame, the projective transformation is represented by the following formula.

$$x'=(ax+by+t_x)/(px+qy+s)$$
$$y'=(cx+dy+t_y)/(px+qy+s) \quad (1)$$

where a, b, c, d, p, q, and s are constants. The projective transformation is a basic form of the two-dimensional transformation, and generally, the case s=1 in formula (1) is called the projective transformation. If p=q=0 and s=1, then the formula represents the affine transformation.

The following is the formula representing the bilinear transformation.

$$x'=gxy+ax+by+t_x$$
$$y'=hxy+cx+dy+t_y \quad (2)$$

where a, b, c, d, g, and h are constants. If g=h=0 in this formula, then the affine transformation can also be obtained as the following formula (3).

$$x'=ax+by+t_x$$
$$y'=cx+dy+t_y \quad (3)$$

In the above formulas, $t_x$ and $t_y$ respectively represent the amounts of parallel shifting motions in the horizontal and vertical directions. Parameter "a" represents an extension/contraction or inversion effect in the horizontal direction, while parameter "d" represents an extension/contraction or inversion effect in the vertical direction. Parameter "b" represents a shearing effect in the horizontal direction, while parameter "c" represents a shearing effect in the vertical direction. In addition, the condition that a=cosθ, b=sinθ, c=−sinθ, and d=cosθ represents rotation by angle θ. The condition that a=d=1 and b=c=0 represents a model equal to a conventional parallel motion model.

As explained above, the motion model employing the affine transformation can represent various motions such as parallel shift, extension/contraction, inversion, shear and rotation and any composite motions consisting of a few kinds of the above motions. Projective or bilinear transformations having many more parameters can represent more complicated motions.

The global motion parameters 5 determined in the global motion estimator 4 are input into global motion compensated predictor 6 together with reference frame 3 stored in frame memory 2. The global motion compensated predictor 6 makes the motion vector (for each pixel) calculated using the global motion parameters 5 act on the reference frame 3, so as to generate global motion-compensating predicted frame (data) 7.

On the other hand, the reference frame 3 stored in the frame memory 2 is input into local motion estimator 8 together with input frame 1. In the local motion estimator 8, motion vector 9 between the input frame 1 and the reference frame 3 is detected for each macroblock of 16 pixels×16 lines. In the local motion compensated predictor 10, local motion-compensating predicted frame (data) 11 is generated using the motion vector 9 of each macroblock and the reference frame 3. The above operation corresponds to the conventional motion compensation method used in MPEG or the like.

Next, the prediction mode determining section 12 chooses one of the global motion-compensating predicted frame 7 and the local motion-compensating predicted frame 11 for each macroblock, the chosen one having a smaller error with respect to the input frame 1. The predicted frame 13 chosen by the prediction mode determining section 12 is input into subtracter 14, and a difference frame 15 between the input frame 1 and the predicted frame 13 is converted into DCT coefficients 17 in DCT (discrete cosine transform) section 16. Each DCT coefficient 17 obtained by the DCT section 16 is further converted into quantized index 19 in quantizer 18. The quantized index 19, global motion parameters 5, motion vector 9, and prediction mode information 26 showing the determined prediction mode output from the prediction mode determining section 12 are respectively encoded in encoding sections 101 to 104, and then multiplexed in the multiplexer 27' so as to generate encoder output (i.e., encoded bit sequence) 28'.

In order to make the reference frames in both the encoder and decoder agree with each other, the quantized index 19 is restored to quantization representative value 21 by inverse quantizer 20, and then inversely converted into difference frame 23 by inverse DCT section 22. The difference frame 23 and the predicted frame 13 are added in adder 24, so that locally decoded frame 25 is obtained. This locally decoded frame 25 is stored in frame memory 2, and is used as a reference frame when the next frame is encoded.

In the decoder (see FIG. 4), the encoded bit sequence 28' which was received is separated using demultiplexer 29' into four encoded components, that is, quantized index 19, prediction mode information 26, motion vector 9, and global motion parameters 5. These four components are respectively decoded by decoding sections 201 to 204. The reference frame 3 (equal to the reference frame 3 as shown in FIG. 3) stored in frame memory 33 is input into global motion compensated predictor 34 together with the decoded global motion parameters 5. The global motion compensated predictor 34 makes the global motion parameters 5 act on the reference frame 3 so as to generate global motion-compensating predicted frame 7 which is the same as frame 7 in FIG. 3. The reference frame 3 is also input into local motion compensated predictor 35. In the local motion compensated predictor 35, the motion vector 9 acts on the reference frame 3 so as to generate local motion-compensating predicted frame 11 which is also the same as frame 11 in FIG. 3.

In the following step, the global and local motion-compensating predicted frames 7 and 11 are input into prediction mode determining section 36. In the prediction mode determining section 36, one of the global and local motion-compensating predicted frames 7 and 11 is chosen based on the decoded prediction mode information 26. The chosen frame is determined as predicted frame 13.

The decoded quantized index 19 is restored to quantization representative value 21 in inverse quantizer 30, and then inversely converted into difference frame 23 in the inverse DCT section 31. The difference frame 13 and the predicted frame 23 are added in adder 32 so that locally decoded frame 25 is obtained. This locally decoded frame 25 is stored in frame memory 33 and is used as a reference frame when the next frame is decoded.

In the global motion-compensated prediction method in the above-explained conventional technique, one of the predicted images, which has the smaller prediction error, obtained by the global and local compensated methods is chosen for each macroblock so as to improve the prediction efficiency over the whole frame. To implement such a system, it is necessary to insert a code word in the encoded data sequence, which represents which prediction method (among the global motion compensation and the local compensation) was used. This is because the decoder must be informed of which motion compensating method was used for the prediction of each macroblock. Therefore, in a proposal (by the present inventors) for the MPEG-4 currently examined for standardization, the encoded data structure (i.e., syntax) of the macroblock is as that shown in the following List 1. In List 1, the encoded data sequence is described using pseudo-C codes, and operations of the encoder and decoder are also described. FIG. 5 is a model diagram showing the data structure (i.e., bit stream structure) represented by List 1, in which data are constructed using code words D1 to D8, the motion vector, and DCT coefficient information (corresponding to the quantized index) in turn.

List 1

| SYNTAX | NUMBER OF BITS |
|---|---|
| macroblock() { | |
|     if (VOP_type == "SPRITE") | |
|         MCSEL | 1 |
|     if (VOP_type == "I") { | |
|         (OMITTED) | |
|     } | |
|     if (VOP_type == "P" || VOP_type == "SPRITE") { | |
|         COD | 1 |
|         if (COD == 1) | |
|             return() | |
|         MCBPC | 1–9 |
|         if (MBTYPE == "INTRA" || MBTYPE == "INTRA+Q") | |
|             Acpred_flag | 1 |
|         CBPY | 2–6 |
|         if (MBTYPE == "INTER+Q" || MBTYPE == "INTRA+Q") | |
|             DQUANT | 1–2 |
|         if (MBTYPE != "INTRA" && MBTYPE != "INTRA+Q") { | |
|             if (VOP_type == "SPRITE") { | |
|                 if (MCSEL == 0) | |
|                     motion_vector(MBTYPE) | |
|             } | |
|             else { | |
|                 motion_vector(MBTYPE) | |
|             } | |
|         } | |

-continued

| SYNTAX | NUMBER OF BITS |
|---|---|
|         for (i =0; i < block_count; i++)<br>           block()<br>    }<br>    else if (VOP_type == "B") {<br>        (OMITTED)<br>    }<br>} | |

In MPEG-4, a conventional frame is called VOP (video object plane). The VOP has four types as shown in the following List 2.

List 2

| VOP Type | Prediction Method |
|---|---|
| I | Intraframe Coding |
| P | Interframe (Predictive) Coding |
| B | Bi-directional Interframe Coding |
| SPRITE | Sprite Coding (using the background of the whole sequence or the global motion compensation) |

The I-, P-, and B-VOPs are the same as I-, P-, and B-pictures defined in MPEG-1 or MPEG-2. The SPRITE-VOP is a newly introduced concept in MPEG-4, in which prediction is performed based on the background picture over the whole part of a video clip in a video data sequence (such a background image being called the "static sprite") or on the "dynamic sprite" obtained by the global motion compensation. In the syntax shown in List 1, descriptions relating to the I-VOP and B-VOP are omitted for simplifying the explanations. Additionally, in MPEG-4, a video object of any form can be encoded and thus, shape information is also described in the relevant syntax; however, such shape information is also omitted for simplifying the explanations.

In a global motion-compensated predictive encoder suitable for the syntax of List 1, if the VOP type is SPRITE, then a 1-bit code word "MCSEL" (see reference symbol D1 in FIG. 5) is output as the prediction mode information 26. MCSEL is a flag indicating which of the global motion compensation and the local motion compensation was used for the prediction of the current macroblock. If the global motion compensation was used, then MCSEL=1, while if the local motion compensation was used, then MCSEL=0.

If the VOP type is P or SPRITE, then a 1-bit code word "COD" (see reference symbol D2) is output. COD is a flag indicating whether the current macroblock was skipped. If no skip and encoding was performed, then COD=0, while if the macroblock was skipped, then COD=1. The skipping of the macroblock occurs when the type of the macroblock is INTER, the motion vector is (0,0), and all DCT coefficient values are zero. In this case, it is unnecessary to encode the macroblock type, information of the motion vector, and the DCT coefficient; thus, a large compression is possible. If COD=0, then the operation proceeds to the next step, while if COD=1, then all the following steps (relating to the current macroblock) are skipped and the operation necessary for processing the next macroblock is started.

In the next step, the encoder outputs a variable-length code word "MCBPC" (see reference symbol D3). MCBPC indicates the macroblock type and the absence/presence of the DCT coefficient of each of two blocks which are selected for sending color-difference signals.

The macroblock has the following five types (or modes) shown in the following List 3.

List 3

| Macroblock Type | Prediction Method |
|---|---|
| INTER | Interframe Prediction |
| INTER + Q | Interframe Prediction (using quantization step information) |
| INTER4V | Interframe Prediction (using four motion vectors) |
| INTRA | Intraframe Prediction |
| INTRA + Q | Intraframe Prediction (using quantization step information) |

If the macroblock type belongs to the intraframe coding mode, that is, is INTRA or INTRA+Q, then code word "Acpred_flag" (see reference symbol D4) is output. "Acpred_flag" is a flag indicating whether the AC (alternating current) coefficient prediction of the DCT was performed with respect to the current macroblock. If the AC coefficient prediction was performed, then Acpred_flag=1, while if no AC coefficient prediction was performed, then Acpred_flag=0.

The encoder then outputs code word "CBPY" (see reference symbol D5).

CBPY indicates whether the DCT coefficients were determined with respect to four blocks for sending brightness signals. If the macroblock type is INTER+Q or INTRA+Q, then quantization step information DQUANT (variable-length code word: D6) is output.

Next, if the macroblock type does not belong to the intraframe coding mode, that is, is neither INTRA nor INTRA+Q, then motion vector information (see reference symbol D7) is output. Here, if the VOP type is SPRITE, then the motion vector information (D7) is output only when MCSEL=0, that is, when the local motion compensation was employed, and thus no motion vector information is output when the global motion compensation is employed.

In the last step, the DCT coefficient information of each 8×8 block included in the 16×16 macroblock is output as quantized index 19 (see reference symbol D8).

In the above-explained syntax, if the macroblock type belongs to the intraframe coding mode (such as INTRA and INTRA+Q), then MCSEL is output also in this case. In the intraframe coding mode, neither global nor local motion compensation is performed; thus, a decision of MCSEL is useless. Therefore, in this case, there occurs the problem that 1-bit of unnecessary data is added for each macroblock.

In addition, if the global motion compensation is effective (for a frame to be encoded), the macroblock skipping is generally performed in the global motion compensation mode, and the macroblock skipping is rarely performed in the local motion compensation mode. Therefore, also in the case of the macroblock skipping, MCSEL is practically useless and there also occurs the problem that 1-bit of unnecessary data is added for each macroblock.

If the transmission rate is high, such overhead data occupies a very small portion of the whole data; thus, no serious problem occurs. However, as the Internet has become widespread very rapidly, video data transmission with a low transmission rate has been required recently. In the encoding of video data having a low-transmission rate, the rate of overhead data to the whole data is inevitably increased. Therefore, the necessity of reducing such overhead data has also increased.

More specifically, the code word MCSEL takes only one bit per macroblock. However, in a CIF (common interface format) picture of 352 pixels×288 lines, MCSEL occupies 396 bits per frame, while in a QCIF (quarter common interface format) picture of 176 pixels×144 lines, MCSEL occupies 99 bits per frame. The amount of MCSEL is fixed regardless of the encoding rate; thus, in the low-rate encoding, the amount of MCSEL increases and it may be a great burden on the system. For example, if QCIF pictures with a transmission rate of 10 frames/sec are encoded with a 20 kbit/sec, then MCSEL occupies a data amount of 99×10≈1 kbit/sec, which thus occupies almost 5% of the whole data rate.

DISCLOSURE OF THE INVENTION

The inventors of the present invention noted the above-described requirement at the start, and tried to solve the above-explained problems. That is, the present invention relates to a video data (i.e., moving pictures) predictive coding method using two kinds of prediction modes, the global and local motion compensation modes, and the objective thereof is to provide a video data predictive encoding method and a corresponding decoding method for reducing unnecessary MCSEL as much as possible, and improving the data compression efficiency.

To achieve the above objective, the present invention provides a predictive encoding method of video data, in which one of a global motion-compensating process for predicting a global motion of the whole frame and a local motion-compensating process for predicting a local motion of each block in a frame is selectively performed, wherein:

if a current block to be processed was interframe-encoded, then a code word for indicating the prediction mode is inserted in an encoded data sequence of the current block, the code word indicating which of the global and local motion-compensating processes was used for predicting the current block, and the code word inserted after another code word indicating the encoding mode of the current block;

otherwise, the code word for indicating the prediction mode is not inserted in the data sequence.

The above is the first method.

In the above method, it is possible that when the current block is block-skipped, the global motion-compensating process is always chosen and in the skipped block, the code word for indicating the prediction mode is omitted. This is the second method of the present invention.

The present invention also provides a decoding method for decoding a data sequence encoded by the above first method, wherein:

if the current block was interframe-encoded, then the code word for indicating the prediction mode is extracted from the data sequence and decoding is performed using the indicated prediction method;

otherwise the code word for indicating the prediction mode is not extracted.

The present invention also provides a decoding method for decoding a data sequence encoded by the above second method, wherein when the current block has been block-skipped, the code word for indicating the prediction mode is not extracted and a decoding process corresponding to the global motion-compensating process is performed.

As described above, if the macroblock type belongs to the intraframe coding mode, that is, the type is INTRA or INTRA+Q, then neither the global motion compensation method nor the local motion compensation method is used; thus, a flag (MCSEL) for indicating which method was adopted is unnecessary. However, in the conventional methods, MCSEL is positioned before the code word (MCBPC) for indicating the macroblock type; therefore, the decoder cannot determine whether MCSEL is necessary until MCBPC is extracted in the decider. In this case, regardless of whether the macroblock type is the intraframe coding mode, MCSEL must be added to every macroblock.

In comparison, according to the above first method according to the present invention, MCSEL is inserted after MCBPC; thus, after the decoder reads out the macroblock type, the decoder can determine whether MCSEL appears. Therefore, in the intraframe coding mode, it is unnecessary to add MCSEL, thereby reducing overhead data.

Also as explained above, if the global motion compensation is effective (for a frame to be encoded), the macroblock skipping is generally performed in the global motion compensation mode, and the macroblock skipping is rarely performed in the local motion compensation mode. Therefore, also in the case of the macroblock skipping, MCSEL is practically useless.

According to the above second method, the macroblock skipping can be limitedly performed in the global motion compensation, thereby omitting MCSEL at the macroblock skipping and further reducing unnecessary overhead data.

That is, according to the predictive encoding and decoding methods of video data of the present invention, unnecessary MCSEL data can be reduced as much as possible, so that overhead data can be reduced and the data-compression efficiency can be improved. The lower the encoding rate, the clearer the effect of the present invention.

The present invention also provides a storage medium storing a program for making a computer execute any method as described above, and a storage medium storing data encoded by any encoding method as described above.

MODES FOR CARRYING OUT THE INVENTION

Hereinbelow, preferred embodiments of the present invention will be explained with reference to the drawings.

Figure 1:
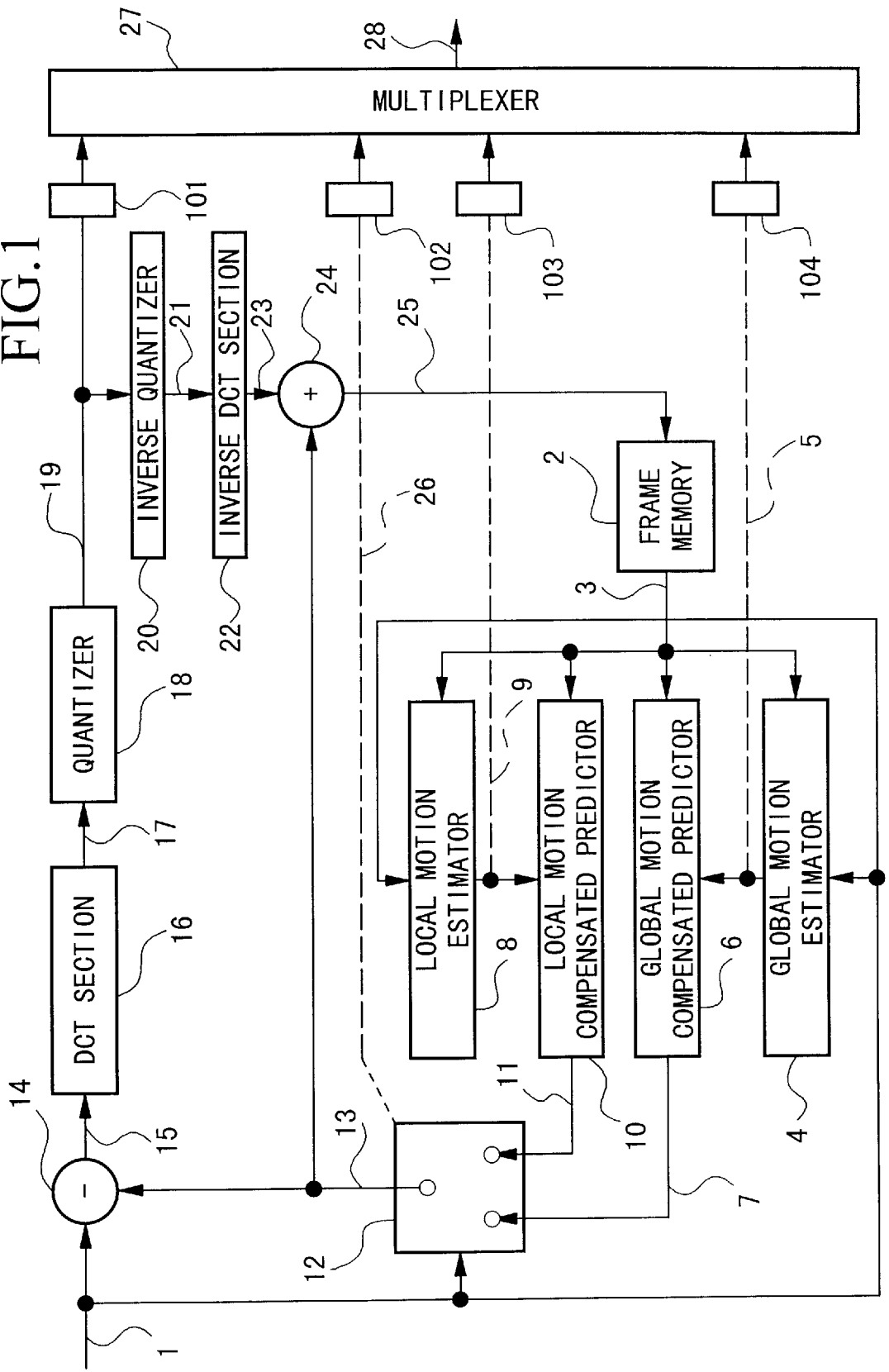
FIG. 1 is a block diagram showing the structure of the encoder used in an embodiment according to the present invention.
Figure 3:
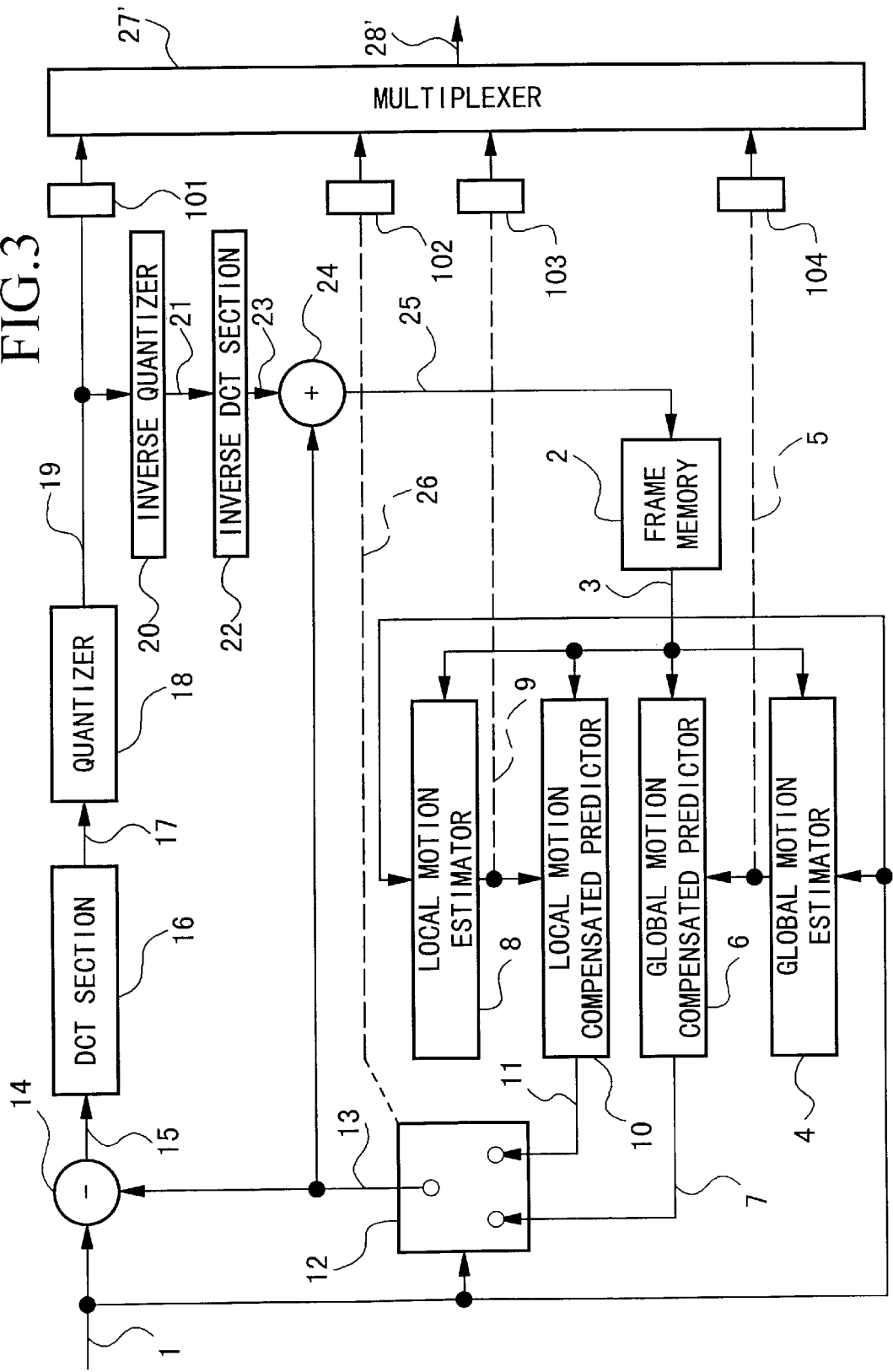
FIG. 3 is a block diagram showing the structure of a conventional example of the encoder.
Figure 6:
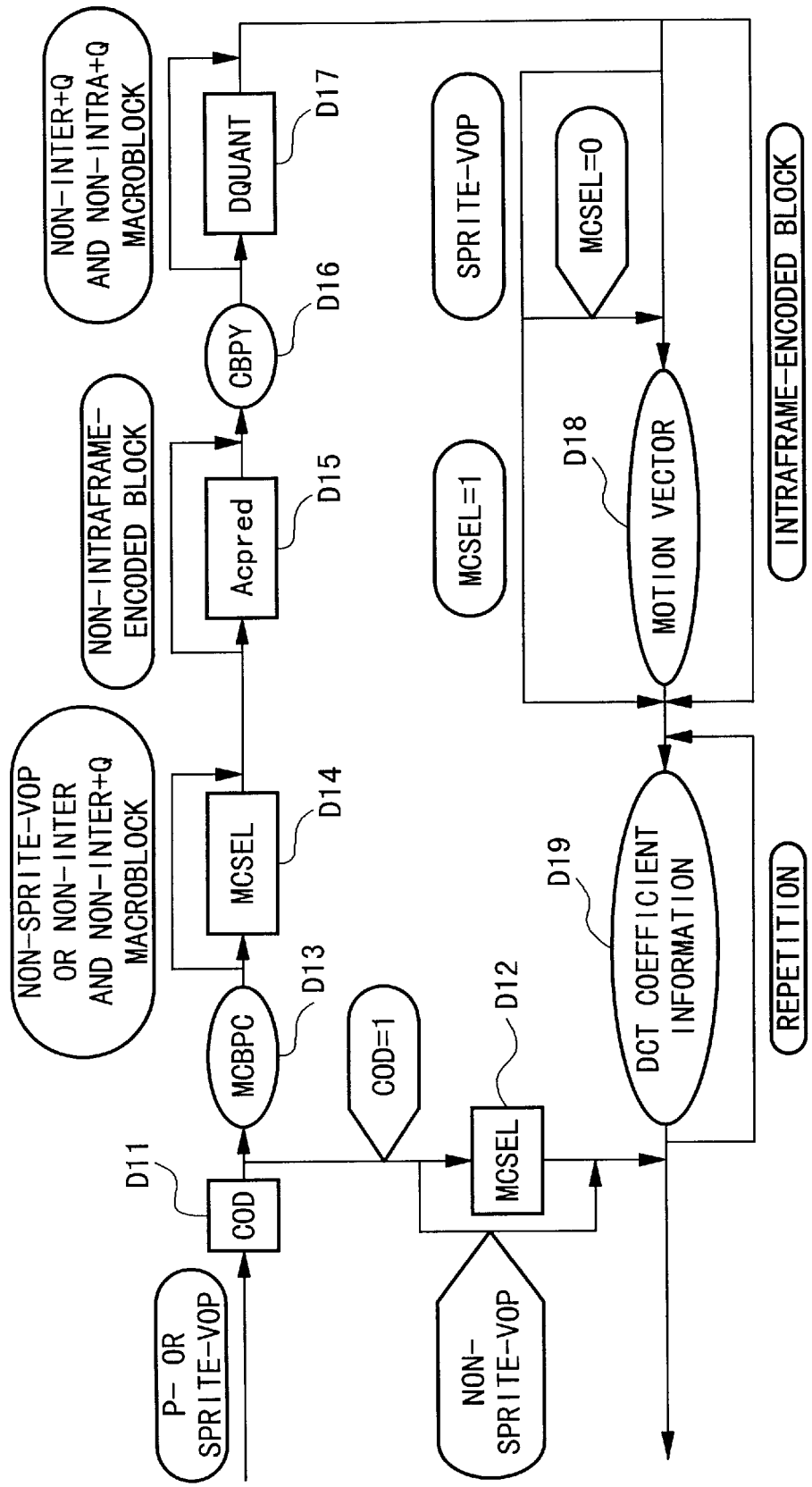
FIG. 6 is a model diagram showing the data structure (i.e., bit stream structure) represented by List 4.

FIG. 1 is a block diagram showing the structure of the encoder used in an embodiment according to the present invention. In comparison with FIG. 3 showing a conventional encoder, only the operation of multiplexer 27 is different in this encoder. This is because the basic structural elements in the encoder and decoder and operation flows according to the present invention are the same as those in the conventional system. However, the structure of the encoded data sequence is different; thus, the encoded data sequence (i.e., syntax) according to the present invention will be explained below with reference to List 4. FIG. 6 is a model diagram showing the data structure (i.e., bit stream structure) represented by List 4, in which data are constructed using code words D11 to D19, the motion vector, and DCT coefficient information (corresponding to the quantized index) in turn.

List 4

| SYNTAX | NUMBER OF BITS |
|---|---|
| macroblock() { | |
|     if (VOP_type == "I") { | |
|         (OMITTED) | |
|     } | |
|     if (VOP_type == "P" \|\| VOP_type == "SPRITE") { | |
|         COD | 1 |
|         if (COD == 1) { | |
|             if (VOP_type == "SPRITE") | |
|                 MCSEL | 1 |
|             return() | |
|         } | |
|         MCBPC | 1–9 |
|         if (VOP_type == "SPRITE" | |
|             && (MBTYPE == "INTER" \|\| MBTYPE == "INTER+Q")) | |
|             MCSEL | 1 |
|         if (MBTYPE == "INTRA" \|\| MBTYPE == "INTRA+Q") | |
|             Acpred_flag | 1 |
|         CBPY | 2–6 |
|         if (MBTYPE == "INTER+Q" \|\| MBTYPE == "INTRA+Q") | |
|             DQUANT | 1–2 |
|         if (MBTYPE != "INTRA" && MBTYPE != "INTRA+Q") { | |
|             if (VOP_type == "SPRITE") { | |
|                 if (MCSEL == 0) | |
|                     motion_vector(MBTYPE) | |
|             } | |
|             else { | |
|                 motion_vector(MBTYPE) | |
|             } | |
|         } | |

| SYNTAX | NUMBER OF BITS |
|---|---|
| ⠀⠀⠀⠀⠀for (i =0; i < block_count; i++)<br>⠀⠀⠀⠀⠀⠀⠀⠀block ()<br>⠀⠀⠀}<br>⠀⠀⠀else if (VOP_type == "B") {<br>⠀⠀⠀⠀⠀(OMITTED)<br>⠀⠀⠀}<br>} | |

As shown in List 4, in the present embodiment, if the VOP type is P or SPRITE, then the above-explained 1-bit code word COD (see reference symbol D11) is output. The macroblock skipping is performed if the macroblock type is INTER, the motion vector is (0, 0), and all DCT coefficients are zero, as in the conventional method. However, information indicating the adopted kind of motion compensation (that is, global or local) is necessary here. Therefore, even when COD=1, if the VOP type is SPRITE, then MCSEL (i.e., (determined) prediction mode information) 26 (see reference symbol D12) is output on this particular condition. Here, if the global motion compensation is used, then MCSEL=1, while if the local motion compensation is used, then MCSEL=0.

If COD=1, then all the following steps (relating to the current macroblock) are skipped and the operation necessary for processing the next macroblock is started. In this case, it is unnecessary to encode the macroblock type, the motion vector information 9, and the DCT coefficient; thus, a large compression is possible.

In the next step, the encoder outputs a variable-length code word MCBPC (see reference symbol D13).

Next, if the VOP type is SPRITE and the macroblock type is INTER or INTER+Q, the above mentioned MCSEL 26 (see reference symbol D14) is output after the above MCBPC.

The choosing operation between the global and local motion compensation modes is performed in the prediction mode determining section 12, as in the conventional system. Any determination method can be adopted, for example, a method for reducing a prediction error, or another method in which both the prediction error and the amount of generated codes are considered.

Next, if the macroblock type belongs to the intraframe coding mode, that is, the type is INTRA or INTRA+Q, then the above-explained code word "Acpred_flag" (see reference symbol D15) is output.

The encoder then outputs the above-explained code word CBPY (see reference symbol D16). In the next step, if the macroblock type is INTER+Q or INTRA+Q, then the above-explained quantization step information DQUANT (variable-length code word: see reference symbol D17) is output. Next, if the macroblock type does not belong to the intraframe coding, that is, the type is neither INTRA nor INTRA+Q, then motion vector 9 (see reference symbol D18) is output. Here, when the VOP type is SPRITE, if MCSEL=1, that is, if the global motion compensation was chosen, then the motion vector 9 is not output, and only if MCSEL=0, that is, the local motion compensation was chosen, then the motion vector 9 is output.

Lastly, the DCT coefficient information of each 8×8 block included in the 16×16 macroblock is output as quantized index 19 (see reference symbol D19).

The quantized index 19 of the DCT coefficient, prediction mode information (MCSEL) 26, motion vector 9, and global motion parameters 5 are respectively encoded in encoding sections 101 to 104, and then multiplexed in the multiplexer 27 according to the above-described operation so as to generate encoder output 28. Here, each VOP needs a set of global motion parameters 5, thus, is not included in the syntax (i.e., List 4) relating to the macroblock layer. Also in the syntax of List 4, descriptions relating to the I-VOP and B-VOP are omitted for simplifying the explanations. Additionally, in MPEG-4, a video object of any form can be encoded and thus, shape information is also described in the relevant syntax, as explained above. However, such shape information is also omitted for simplifying the explanations.

Figure 2:
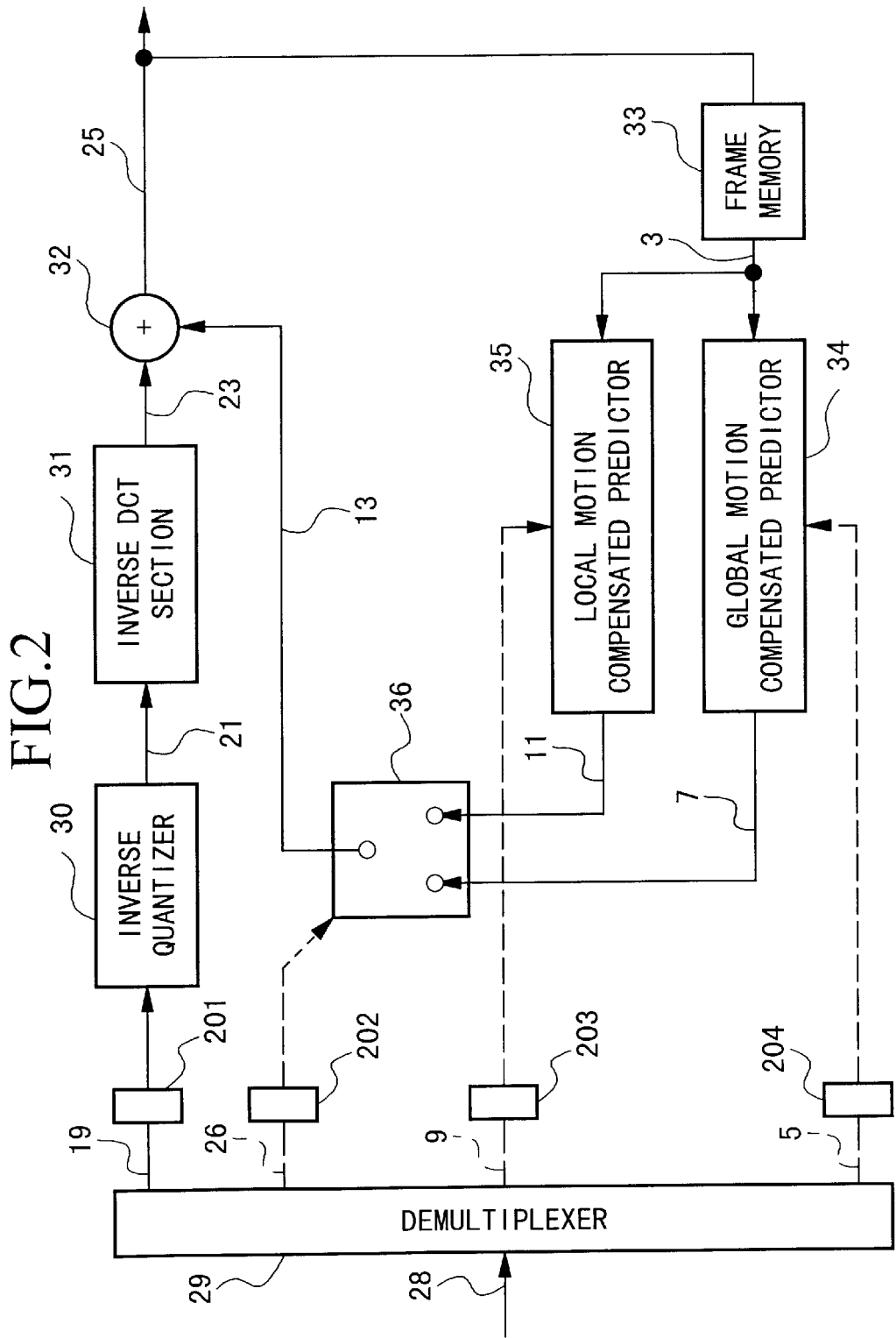
FIG. 2 is a block diagram showing the structure of the decoder used together with the encoder of FIG. 1.
Figure 4:
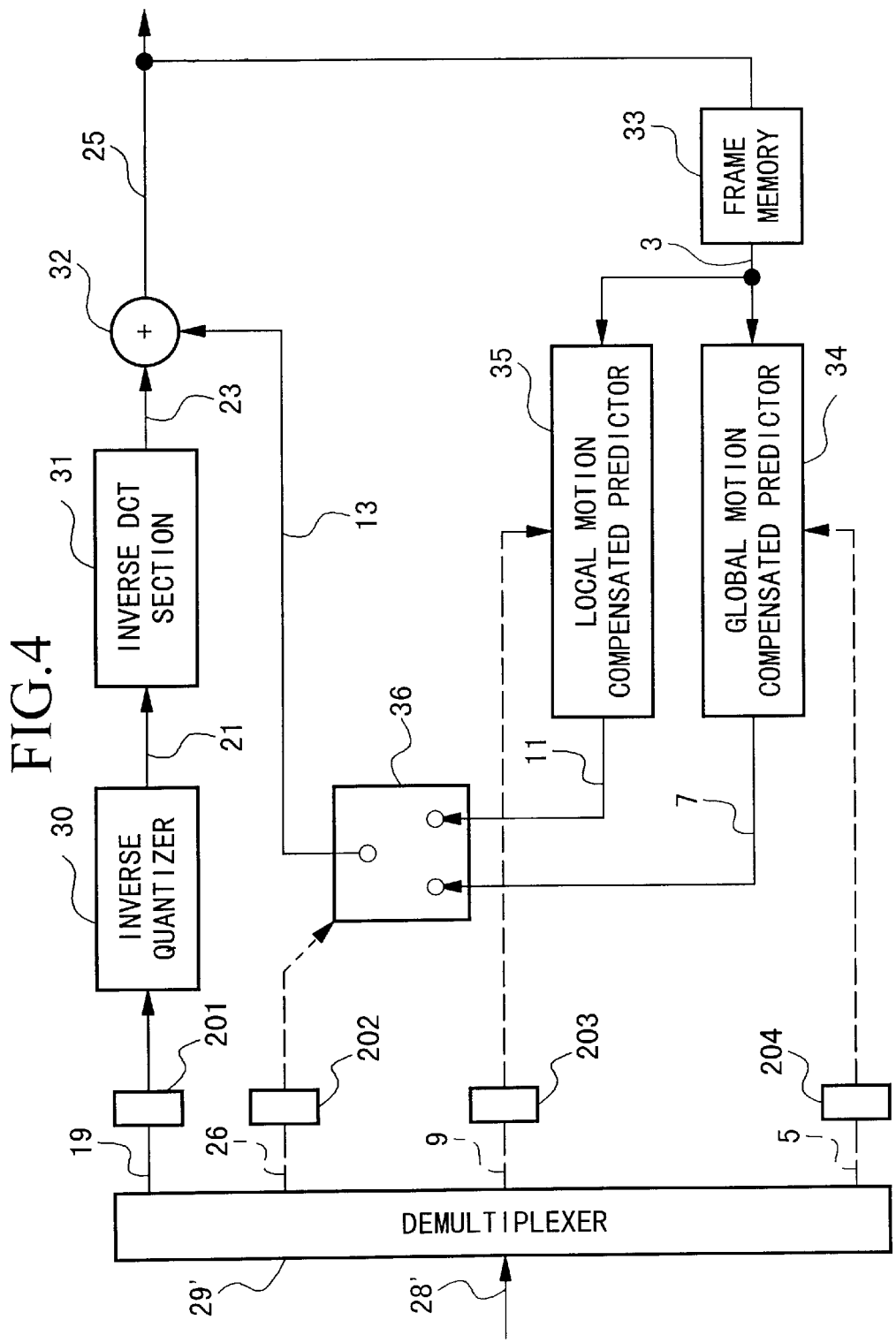
FIG. 4 is a block diagram showing the structure of the decoder used together with the encoder of FIG. 3.
Figure 5:
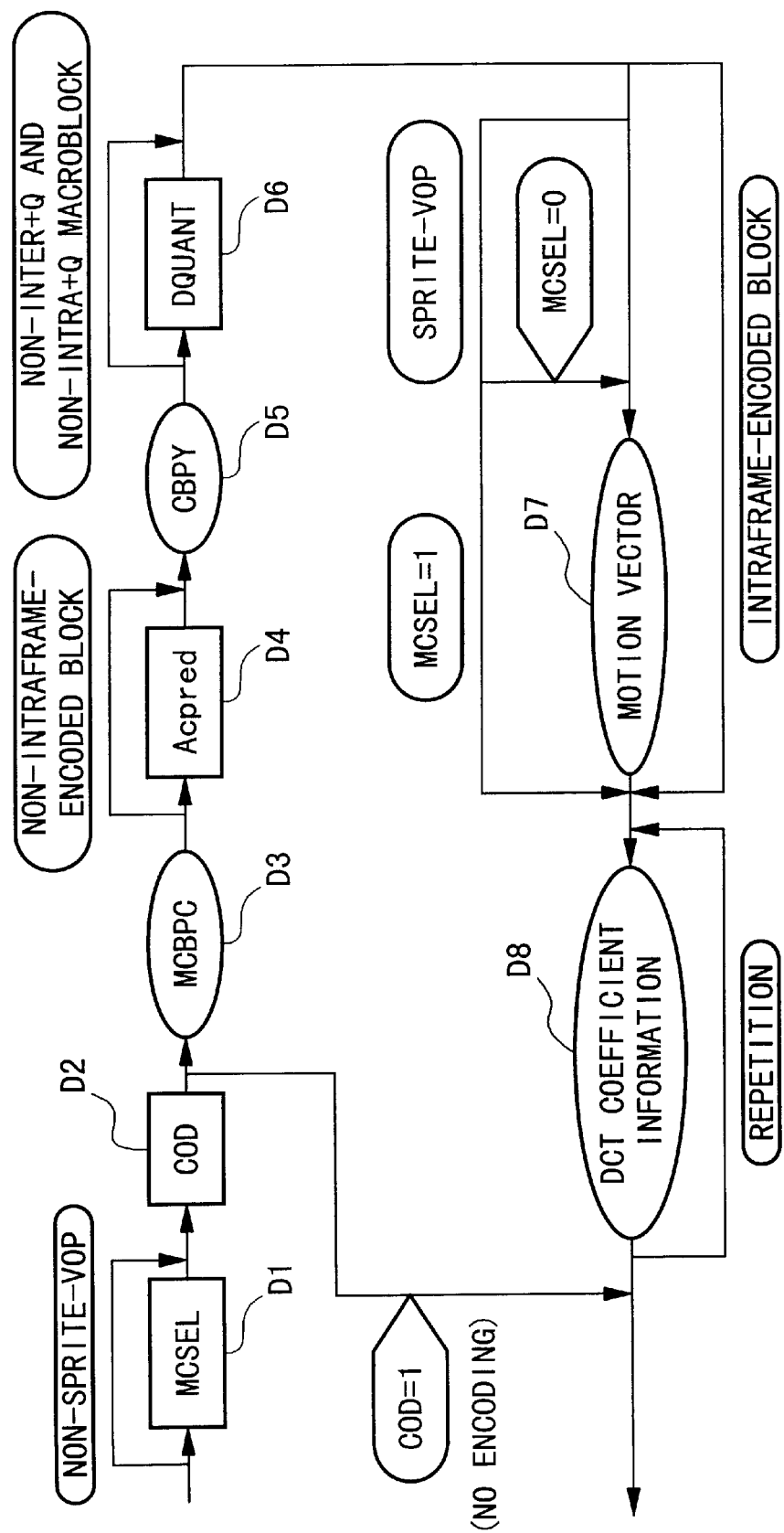
FIG. 5 is a model diagram showing the data structure (i.e., bit stream structure) represented by List 1.

FIG. 2 is a block diagram showing the structure of the decoder used together with the encoder of FIG. 1. In comparison with the structure of the conventional decoder as shown in FIG. 4, only the operation of demultiplexer 29 is different.

Below, the operation of the present decoder will be explained with reference to FIG. 2, List 4, and FIG. 6.

As shown in List 4, in the decoder of the present embodiment, first, if the VOP type is P or SPRITE, then code word COD (D11) is extracted (or read out). Next, if COD=1 and the VOP type is SPRITE, then MCSEL (D12) is extracted.

The code word MCSEL activates selector 36, and if MCSEL=1, then global motion-compensating predicted frame 7 is chosen as predicted frame 13. If MCSEL=0, all DCT coefficients are zero; thus, the acquired predicted frame 13 itself is output as decoded frame 25 of the current macroblock.

If COD=0, then the variable-length code word MCBPC (D13) is extracted. According to the extracted MCBP, information on the macroblock type and the absence/presence of the DCT coefficient of each of two blocks selected for sending color-difference signals is obtained.

Following to MCBPC, if the VOP type is SPRITE and the macroblock type is INTER or INTER+Q, then MCSEL (D14) is extracted.

Next, if the macroblock type is INTRA or INTRA+Q, then the code word Acpred_flag (D15) is extacted.

Then, CBPY (D16) is extracted so as to obtain decoded information on presence/absence of the DCT coefficients with respect to brightness signals. In the next step, if the macroblock type is INTER+Q or INTRA+Q, then the variable-length code word, quantization step information DQUANT (D17), is extracted.

Next, if the macroblock type is neither INTRA nor INTRA+Q, motion vector 9 (D18) is extracted. Here, when the VOP type is SPRITE, if MCSEL=1, that is, if the global motion compensation was adopted, then no motion vector information exists and thus motion vector 9 is not extracted, while if MCSEL=0, that is, the local motion compensation was adopted, then motion vector 9 is extracted on this particular condition. MCSEL activates the selector 36. If MCSEL=1, then the global motion-compensating predicted frame 7, acquired using reference frame 3 and global motion parameters 5, is determined as predicted frame 13, while if MCSEL=0, then the local motion-compensating predicted frame 11, acquired using reference frame 3 and global motion parameters 9, is determined as predicted frame 13.

In the next step, DCT coefficient information (D19) on each 8×8 block included in the relevant macroblock, that is, quantized index 19, is extracted. The quantized index 19 is restored to quantization representative value 21 by inverse quantizer 30, and then inversely converted into difference frame 23 by inverse DCT section 31. The difference frame 23 and the predicted frame 13 are added in adder 32, so that decoded frame 25 is obtained. This decoded frame 25 is stored in frame memory 33, and is used as a reference frame when the next frame is decoded.

Figure 7:
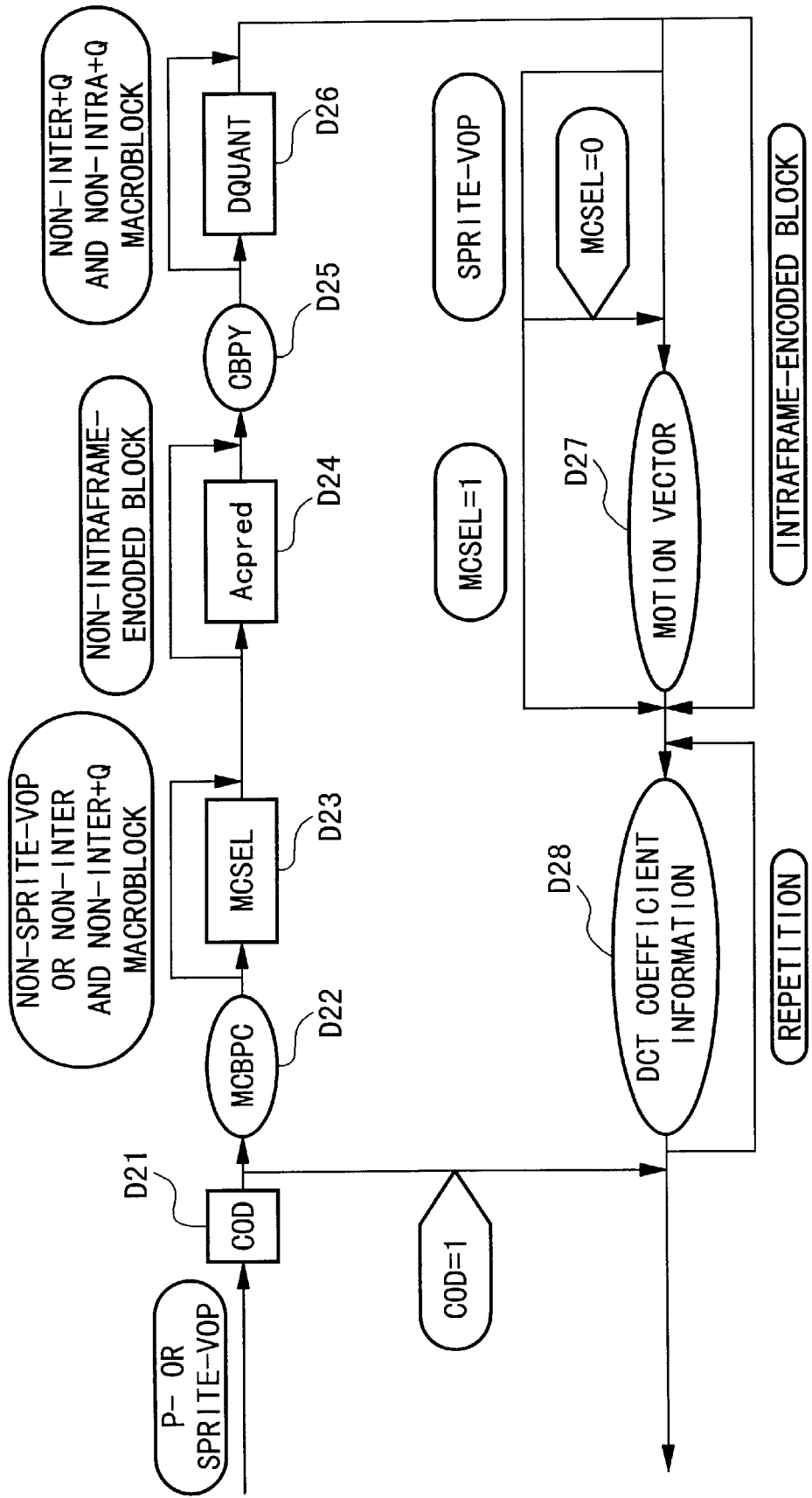
FIG. 7 is a model diagram showing the data structure (i.e., bit stream structure) represented by List 5.

Hereinbelow, a predictive coding method for reducing overhead data in the macroblock skipping will be explained with reference to FIG. 1 and the following List 5. FIG. 7 is a model diagram showing the data structure (i.e., bit stream structure) represented by List 5, in which data are constructed using code words D21 to D28, the motion vector, and DCT coefficient information in turn.

the local motion compensation is adopted. Therefore, relevant MGSEL appearing in List 4 is omitted in List 5. In the macroblock skipping, all the following steps with respect to the current macroblock are skipped and the operation for processing the next macroblock is started. Therefore, it is unnecessary to encode the macroblock type and the DCT coefficient of the current macroblock; thus, a large compression can be achieved.

Next, the encoder outputs the variable-length code word MCBPC (see reference symbol D22).

Following to MCBPC, if the VOP type is SPRITE, and the macroblock is INTER or INTER+Q, MCSEL (see reference symbol D23) is output. Any method can be adopted for determining the motion-compensating mode by the prediction mode determining section 12, for example, a method for reducing a prediction error, or another method in which both the prediction error and the amount of generated codes are considered.

Next, if the macroblock type is the intraframe coding mode, that is, INTRA or INTRA+Q, then code word Acpred_flag (see reference symbol D24) is output.

In the next step, the encoder outputs the variable-length code word CBPY (see reference symbol D25). Next, if the macroblock type is INTER+Q or INTRA+Q, then the variable-length code word, quantization step information DQUANT (see reference symbol D26), is output.

Next, if the macroblock type does not belong to the intraframe coding mode, that is, is neither INTRA nor List 5

| SYNTAX | NUMBER OF BITS |
|---|---|
| macroblock() { | |
|     if (VOP_type == "I") { | |
|         (OMITTED) | |
|     } | |
|     if (VOP_type == "P" \|\| VOP_type == "SPRITE") { | |
|         COD | 1 |
|         if(COD == 1) | |
|             return() | |
|         MCBPC | 1–9 |
|         if (VOP_type == "SPRITE" && | |
|             (MBTYPE == "INTER" \|\| MBTYPE == "INTER+Q") | |
|             MCSEL | 1 |
|         if (MBTYPE == "INTRA" \|\| MBTYPE == "INTRA+Q") | |
|             Acpred_flag | 1 |
|         CBPY | 2–6 |
|         if (MBTYPE == "INTER+Q" \|\| MBTYPE == "INTRA+Q") | |
|             DQUANT | 1–2 |
|         if (MBTYPE != "INTRA" && MBTYPE != "INTRA+Q") { | |
|             if (VOP_type == "SPRITE") { | |
|                 if (MCSEL == 0) | |
|                     motion_vector(MBTYPE) | |
|             } | |
|             else { | |
|                 motion_vector(MBTYPE) | |
|             } | |
|         } | |
|         for (i =0; i < block_count; i++) | |
|             block () | |
|     } | |
|     else if (VOP_type == "B") { | |
|         (OMITTED) | |
| } | |

In List 5, if the VOP type is P or SPRITE, then code word COD (see reference symbol D21) is output. The macroblock skipping indicated by COD is adopted when the global motion compensation is used and all DCT coefficients are zero, that is, the macroblock skipping is not performed when INTRA+Q, then motion vector 9 (see reference symbol D27) is output. Here, when the VOP type is SPRITE, if MCSEL=1, that is, if the global motion compensation was adopted, then no motion vector information is output, while if MCSEL=0, that is, if the local motion compensation was adopted, then the motion vector is output on this particular condition.

Lastly, DCT coefficient information 9 (see reference symbol D28) with respect to each 8×8 block included in the current macroblock is output.

The multiplexer 27 then multiplexes quantized index 19, prediction mode information (MCSEL) 26, motion vector 9, and global motion parameters 5 (which were respectively output as explained above), and outputs an encoder output 28. Here, the global motion parameters 5 are not included in the syntax of List 5, as in List 4.

In the syntax of List 5, descriptions corresponding to I-VOP and B-VOP are omitted for simplicity. Additionally, the above-described shape information with respect to MPEG-4 is also omitted in the relevant syntax.

Below, the operation of the decoder for decoding data encoded by the above-explained predictive encoding method will be explained with reference to FIG. 2, List 5, and FIG. 7.

In the decoding method shown in List 5, first, if the VOP type is P or SPRITE, then the code word COD (see reference symbol D21) is extracted. If COD=1, then the global motion-compensating predicted frame 7, obtained using reference frame 3 and global motion parameters 5, is determined as predicted frame 13. If COD=1, all the DCT coefficients are zero; thus, the obtained predicted frame 13 itself is output as the decoded frame 25 of the current macroblock.

If COD=0, then the variable-length code word MCBPC (see reference symbol D22) is extracted so as to obtain decoded information on the macroblock type and the presence/absence of DCT coefficients with respect to two signals indicating color difference.

Following to MCBPC, if the VOP type is SPRITE and the macroblock type is INTER or INTER+Q, then MCSEL (see reference symbol D23) is extracted.

Next, if the macroblock type is INTRA or INTRA+Q, then code word Acpred_flag (see reference symbol D24) is extracted.

In the next step, CBPY (see reference symbol D25) is extracted so as to obtain decoded information on the DCT coefficients with respect to the brightness signals. Next, if the macroblock type is INTER+Q or INTRA+Q, then quantization step information DQUANT (see reference symbol D26), a variable-length code word, is extracted.

Next, if the macroblock type is neither INTRA nor INTRA+Q, then motion vector 9 (see reference symbol D27) is extracted. Here, when the VOP type is SPRITE, if MCSEL=1, that is, the global motion compensation was used, no motion vector exists and thus the motion vector extraction is not performed. If MCSEL=0, that is, the local motion compensation was used, motion vector 9 is extracted on this particular condition. MCSEL activates selector 36, and if MCSEL=1, then global motion-compensating predicted frame 7, obtained using reference frame 3 and global motion parameters 5, is determined as predicted frame 13. If MCSEL=0, then local motion-compensating predicted frame 11, obtained using reference frame 3 and motion vector 9, is determined as predicted frame 13.

Next, DCT coefficient information (see reference symbol D28) on each 8×8 block included in the current macroblock, that is, quantized index 19 is extracted. The quantized index 19 is restored to quantization representative value 21 in inverse quantizer 30, and then inversely converted into difference frame 23 in the inverse DCT section 31. The difference frame 13 and the predicted frame 23 are added in adder 32 so that decoded frame 25 is obtained. This decoded frame 25 is stored in frame memory 33 and is used as a reference frame when the next frame is decoded.

Flowcharts of programs for executing the above-explained methods in the above embodiments of the present invention are appended. In addition, the flowcharts for executing the conventional methods are also appended for comparison.

In the flowcharts, some steps belonging to the conventional process such as the decision of the VOP type and the decision or determination of the macroblock type (in the determination, a most efficient macroblock type is selected) are omitted. These omitted steps can be considered unnecessary for explaining the present invention.

Figure 8:
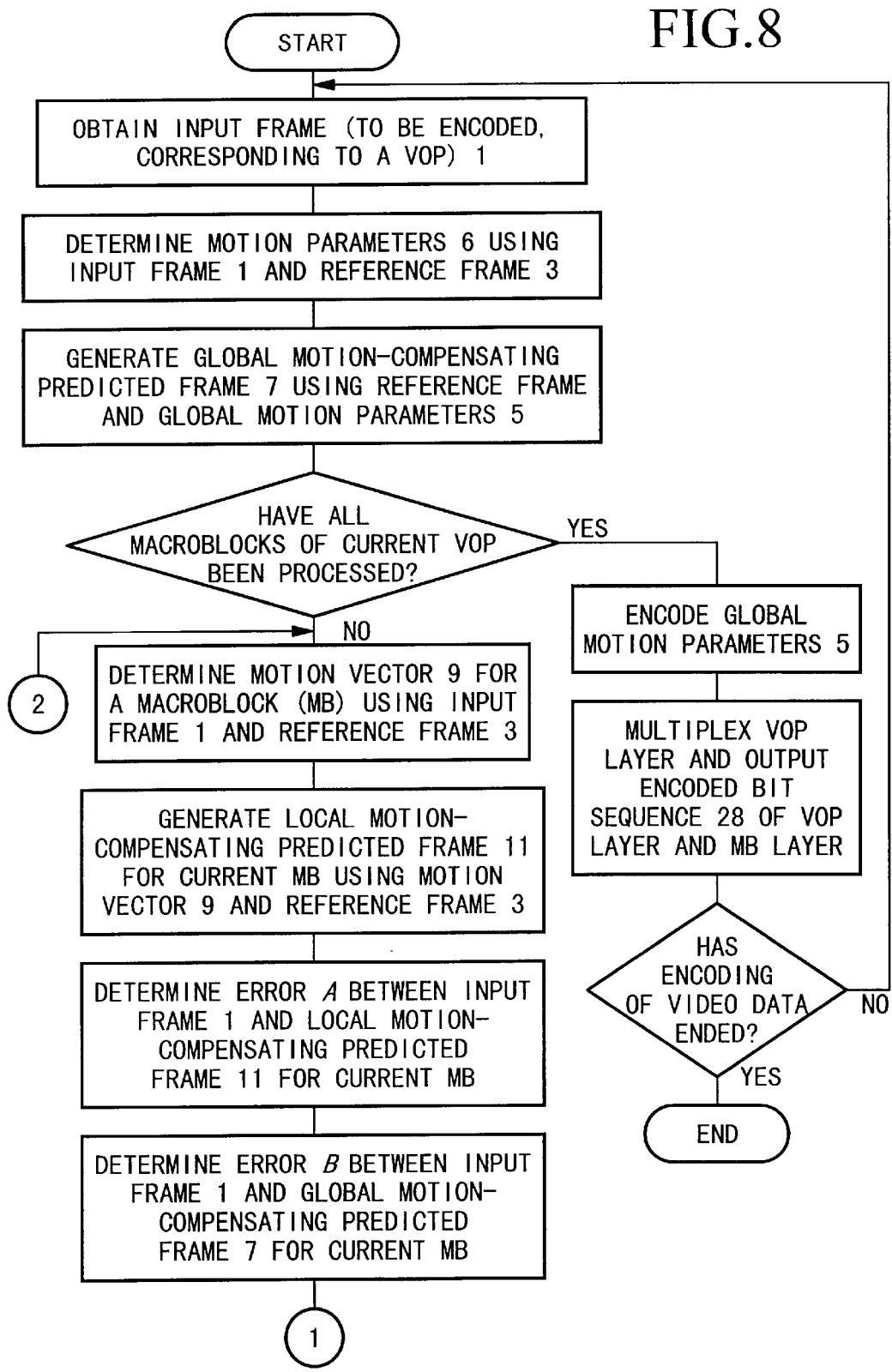
FIG. 8 is a flowchart (1) corresponding to the whole prediction encoding program of video data.
Figure 9:
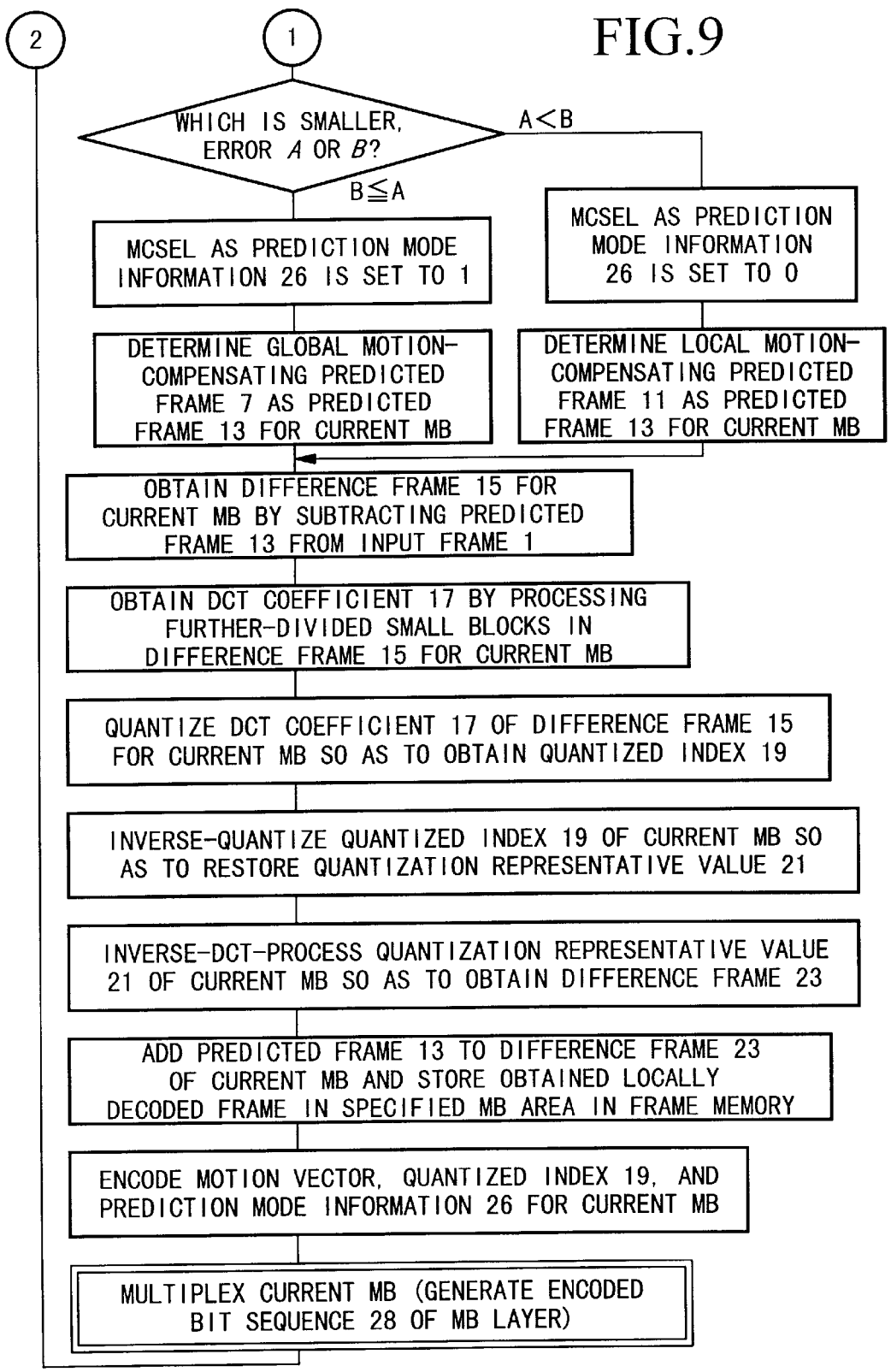
FIG. 9 is a flowchart (2) corresponding to the whole prediction encoding program of video data.

FIGS. 8 and 9 are flowcharts corresponding to the whole predictive encoding program of video data (i.e., moving pictures). In the figures, "①" in FIG. 8 indicates that this line continues to "①" in FIG. 9, while "②" in FIG. 8 continues to "②" in FIG. 9. The multiplexing process in the double-border block in FIG. 9 relates to a distinctive feature of the present invention.

Figure 10:
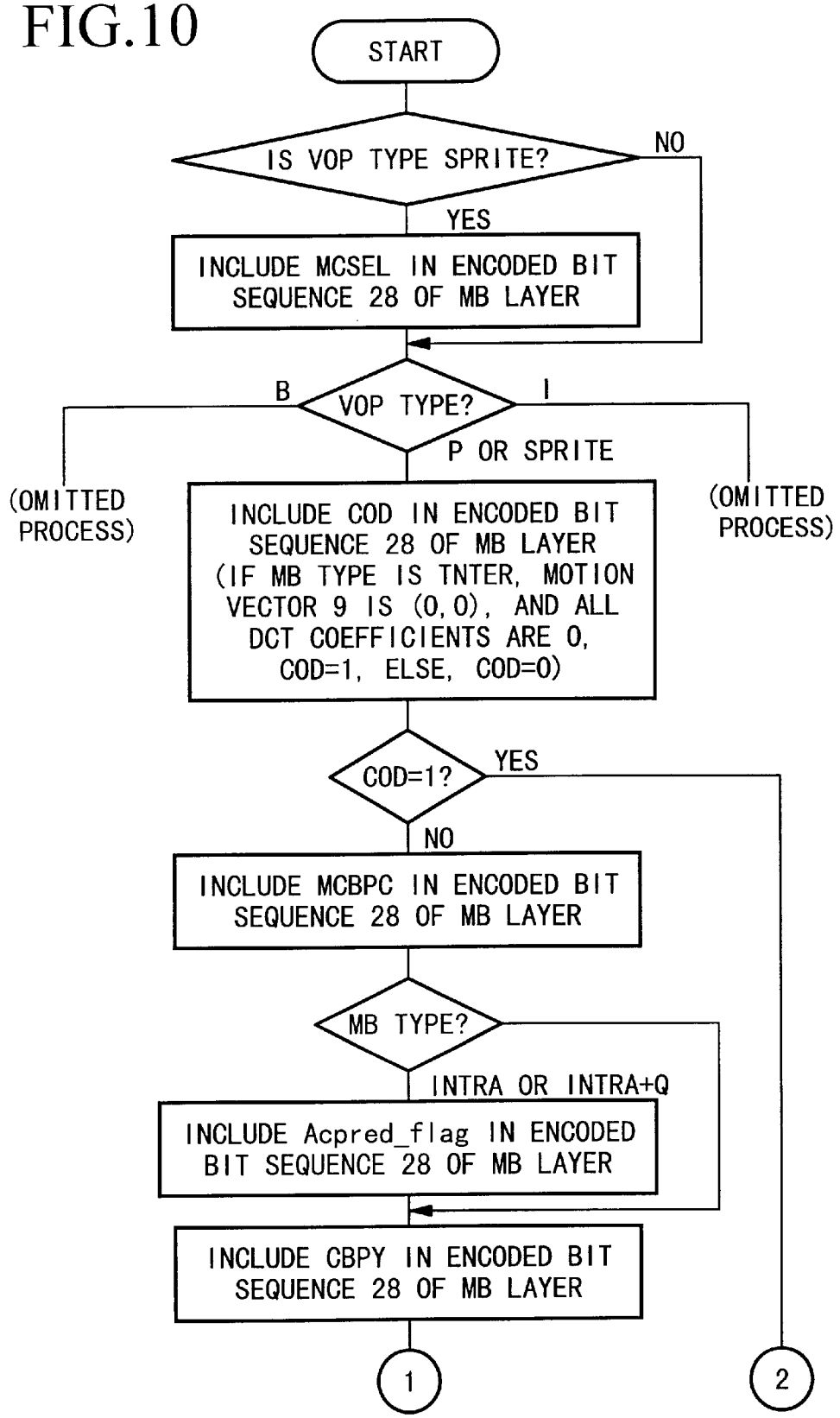
FIG. 10 is a flowchart (1) showing a conventional example of the macroblock layer multiplexing operation.
Figure 11:
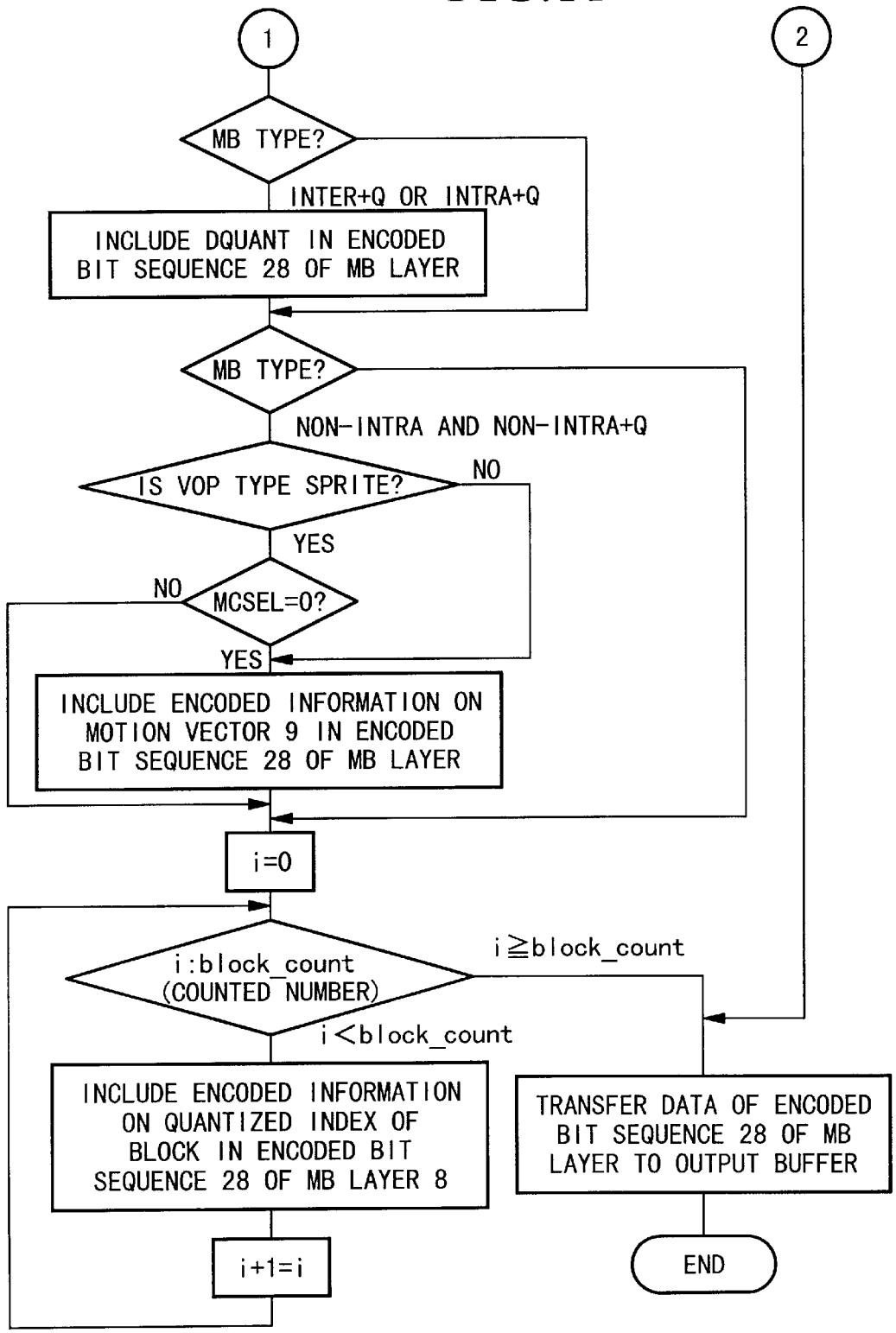
FIG. 11 is a flowchart (2) showing a conventional example of the macroblock layer multiplexing operation.

FIGS. 10 and 11 are flowcharts showing a conventional example of the macroblock layer multiplexing operation, and "①" and "②" in FIG. 10 respectively indicate that the relevant lines continue to "①" and "②" in FIG. 11.

Figure 12:
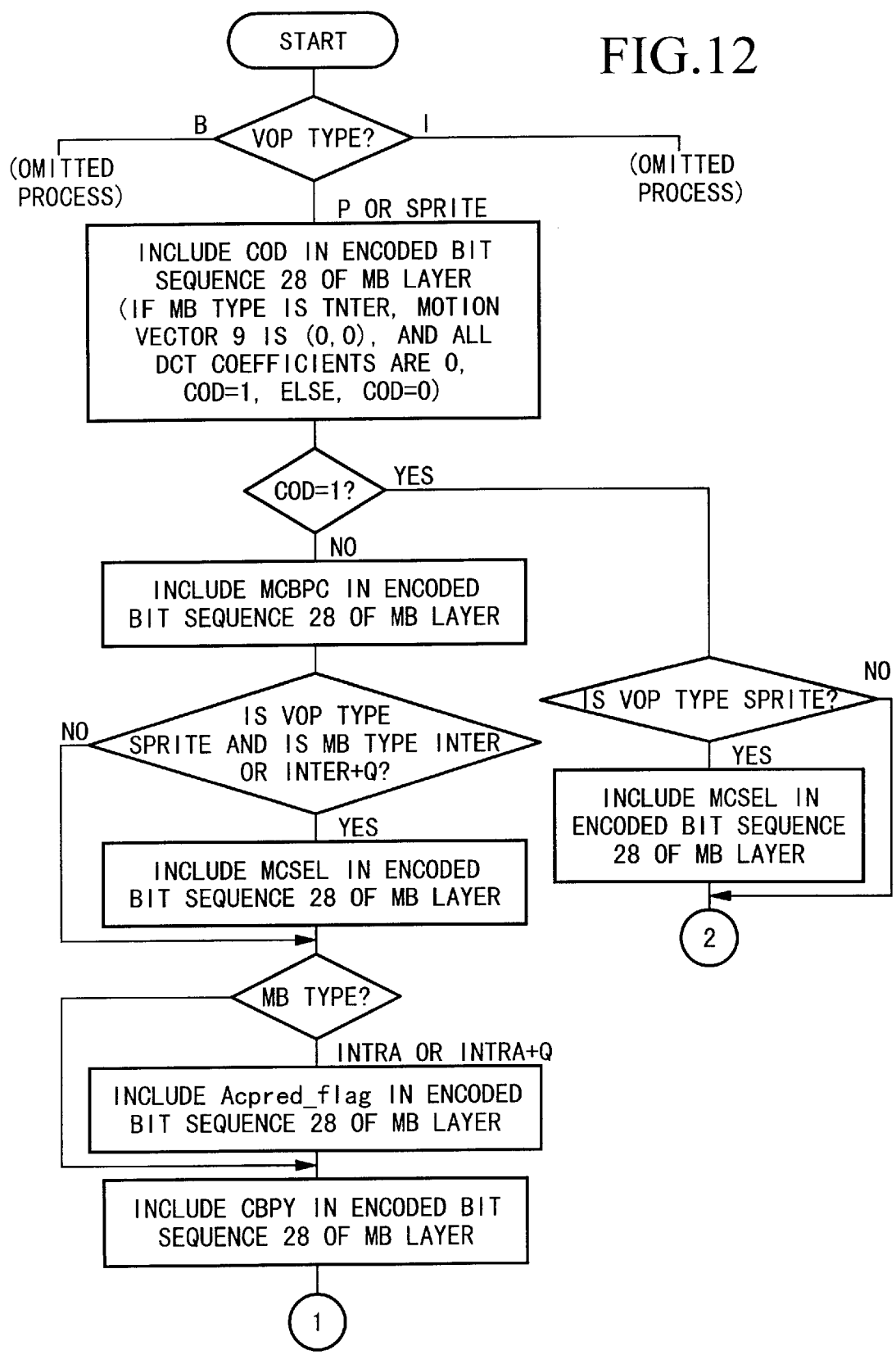
FIG. 12 is a flowchart (1) showing an example of the macroblock layer multiplexing operation according to the (first) method of the present invention.
Figure 13:
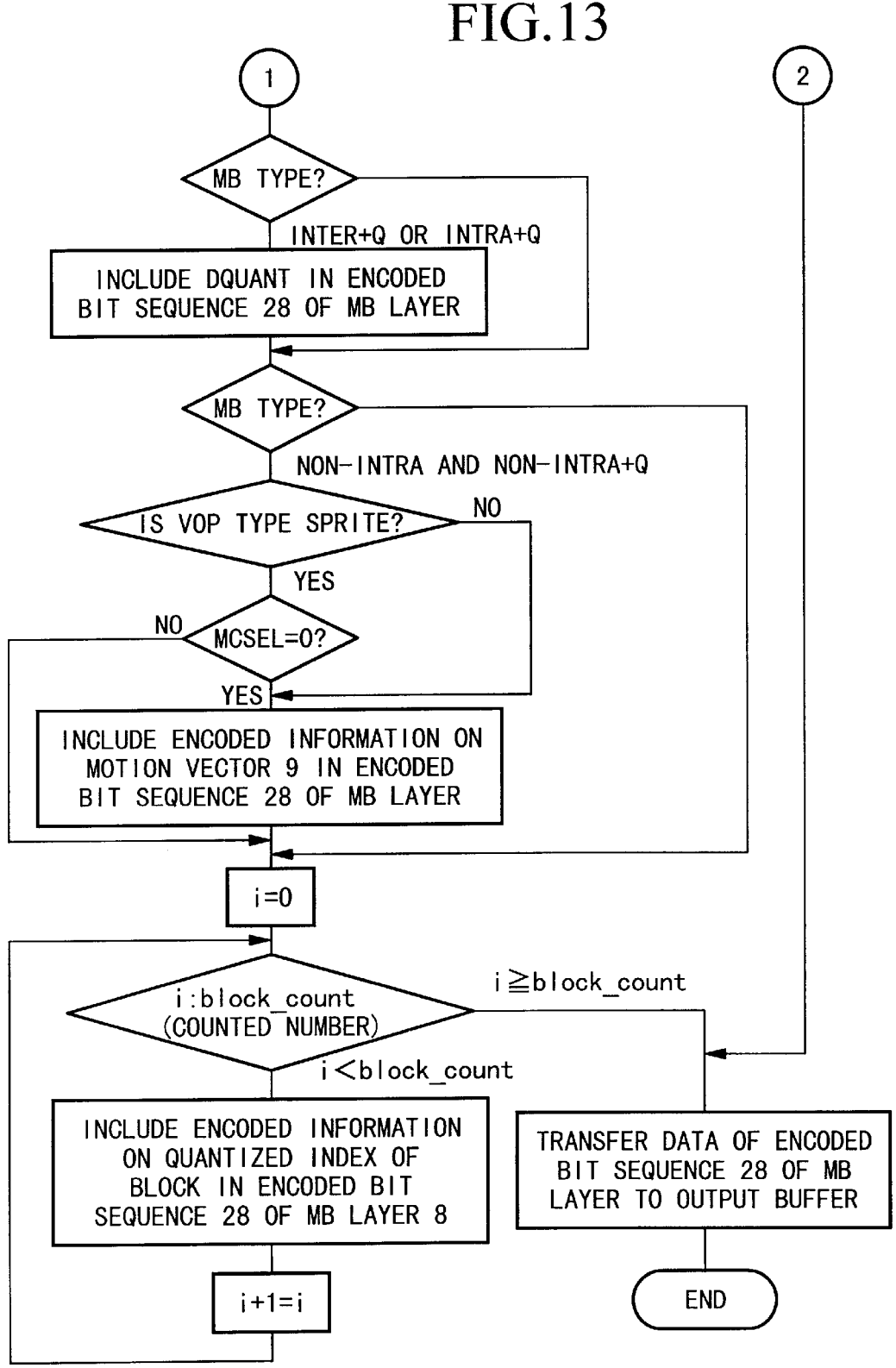
FIG. 13 is a flowchart (2) showing an example of the macroblock layer multiplexing operation according to the (first) method of the present invention.

FIGS. 12 and 13 are flowcharts showing a (first) example of the macroblock layer multiplexing operation according to the present invention, explained with reference to List 4 and FIG. 6, and "①" and "②" in FIG. 12 respectively indicate that the relevant lines continue to "①" and "②" in FIG. 13.

Figure 14:
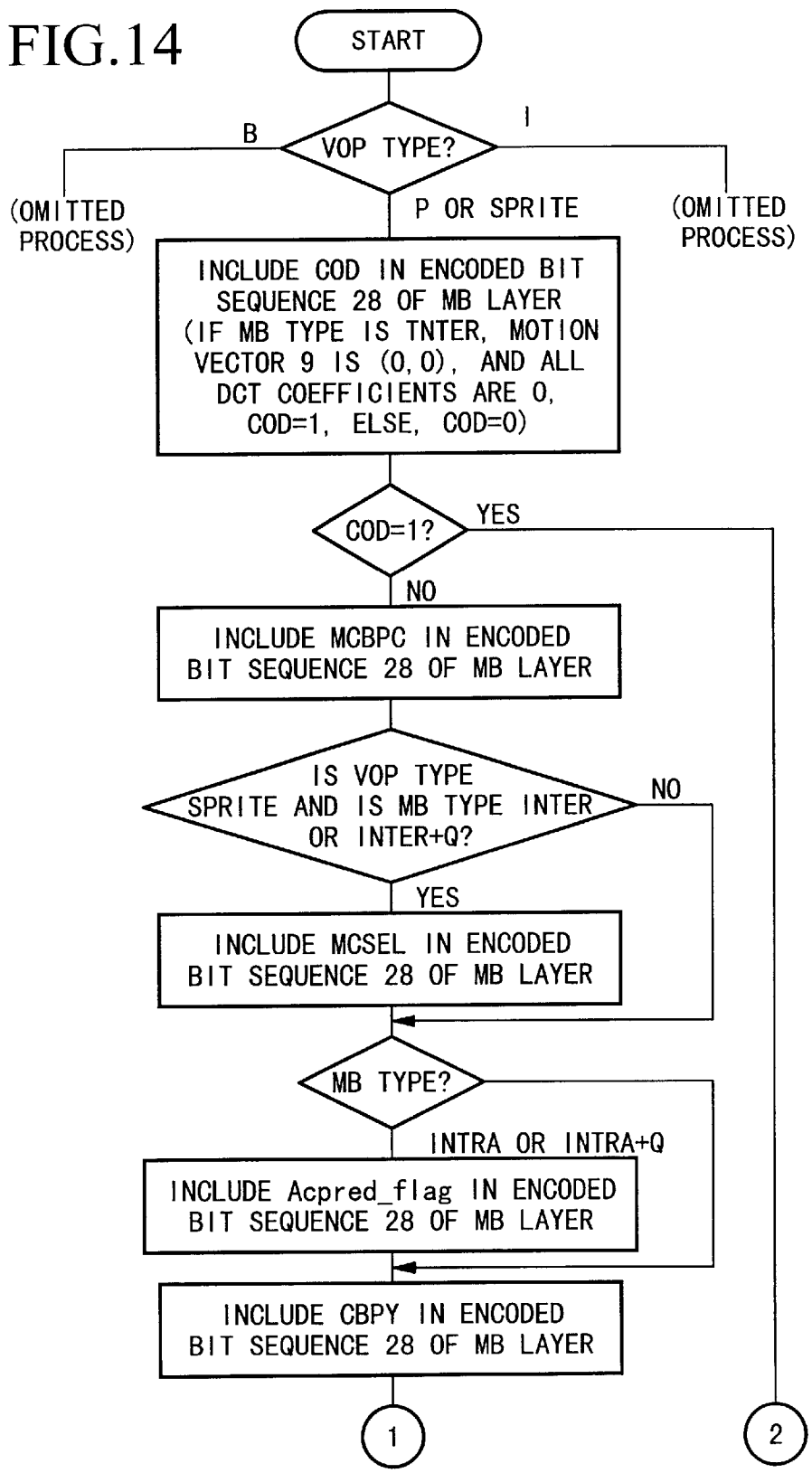
FIG. 14 is a flowchart (1) showing an example of the macroblock layer multiplexing operation according to the (second) method of the present invention.
Figure 15:
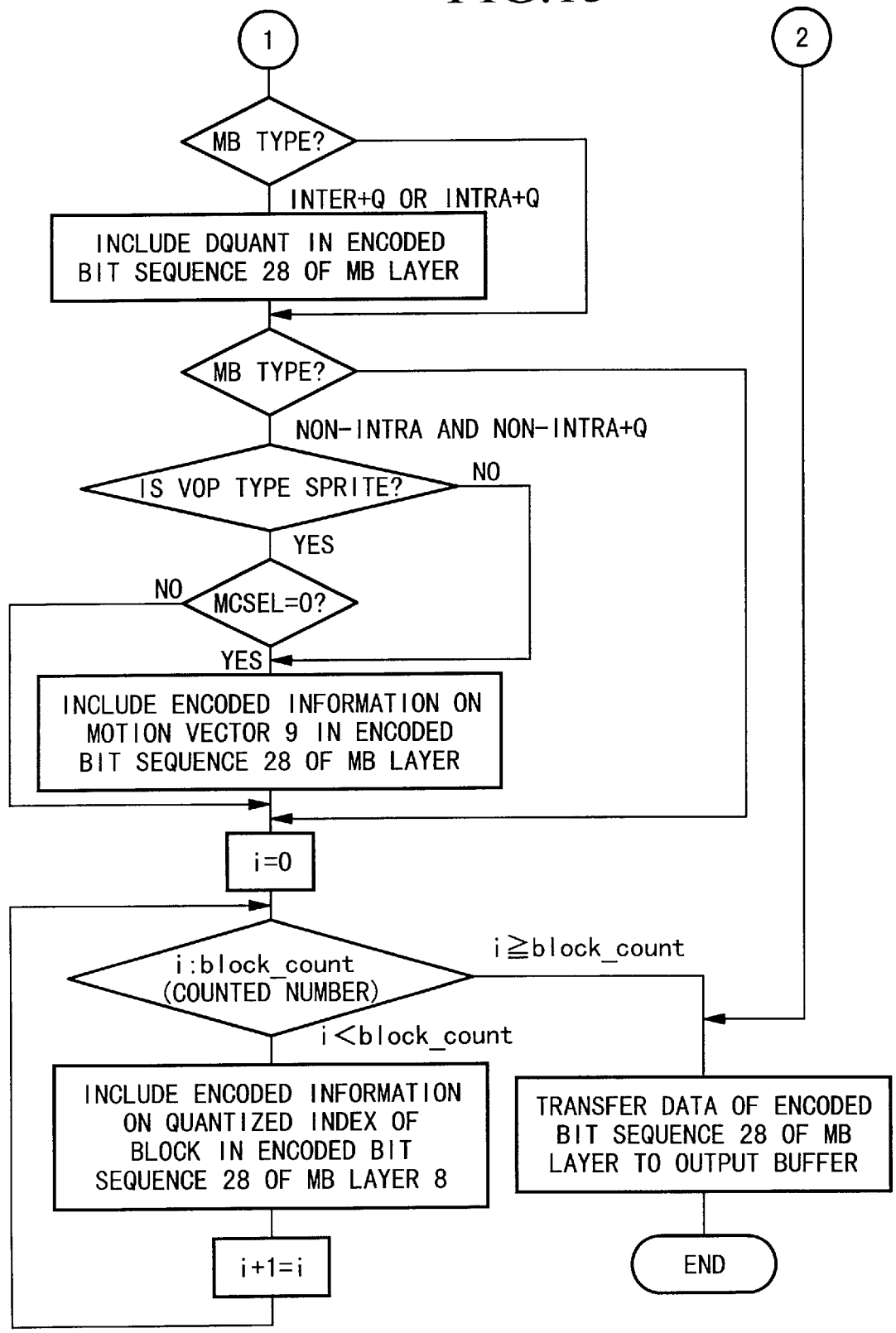
FIG. 15 is a flowchart (2) showing an example of the macroblock layer multiplexing operation according to the (second) method of the present invention.

FIGS. 14 and 15 are flowcharts showing a (second) example of the macroblock layer multiplexing operation according to the present invention, explained with reference to List 5 and FIG. 7, and "①" and "②" in FIG. 14 respectively indicate that the relevant lines continue to "①" and "②" in FIG. 15.

Figure 16:
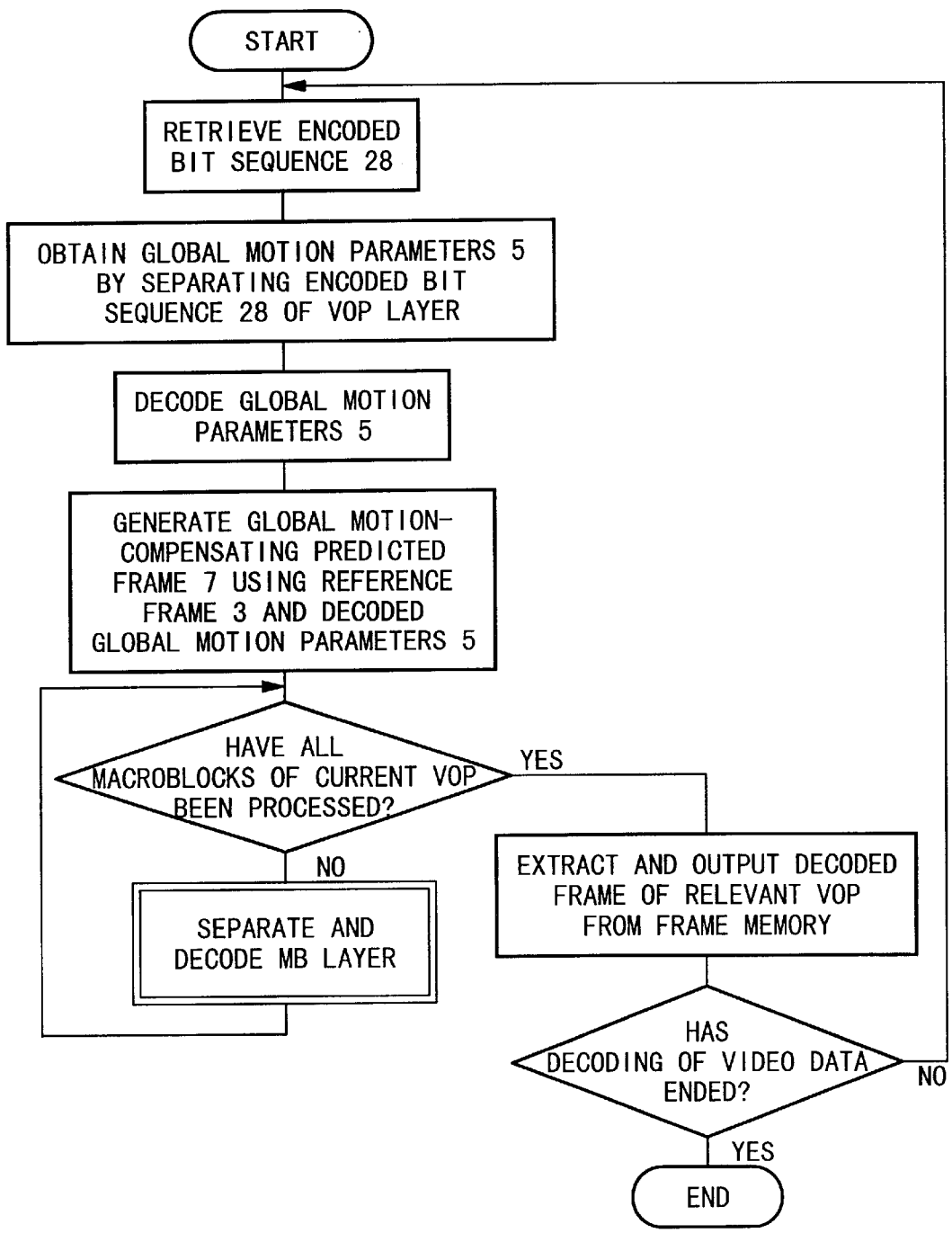
FIG. 16 is a flowchart corresponding to the whole prediction decoding program of video data.

FIG. 16 is a flowchart corresponding to the whole predictive decoding program of video data. The demultiplexing and decoding process in the double-border block of this figure relates to a distinctive feature of the present invention.

Figure 17:
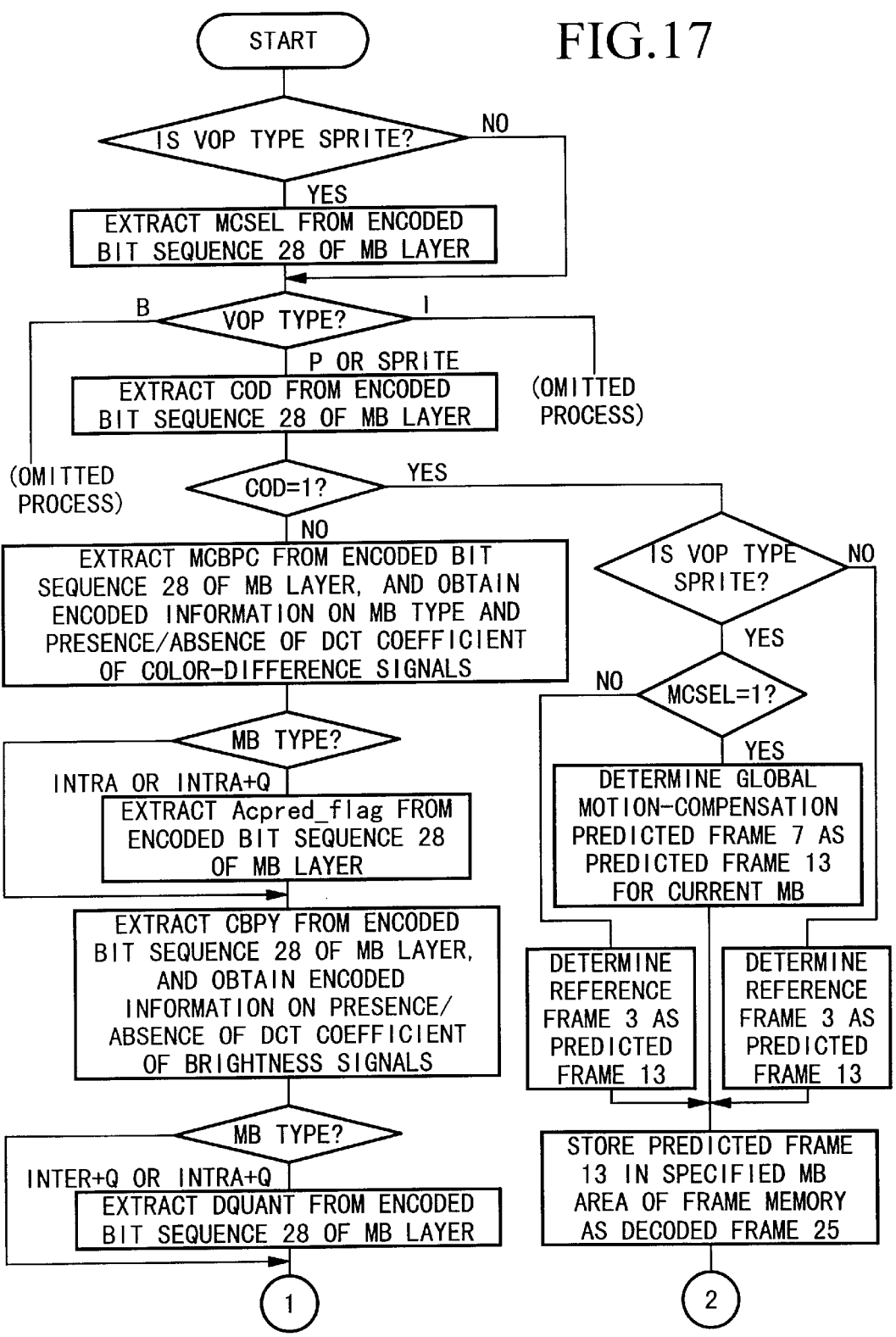
FIG. 17 is a flowchart (1) showing a conventional example of the macroblock layer demultiplexing and decoding operation.
Figure 18:
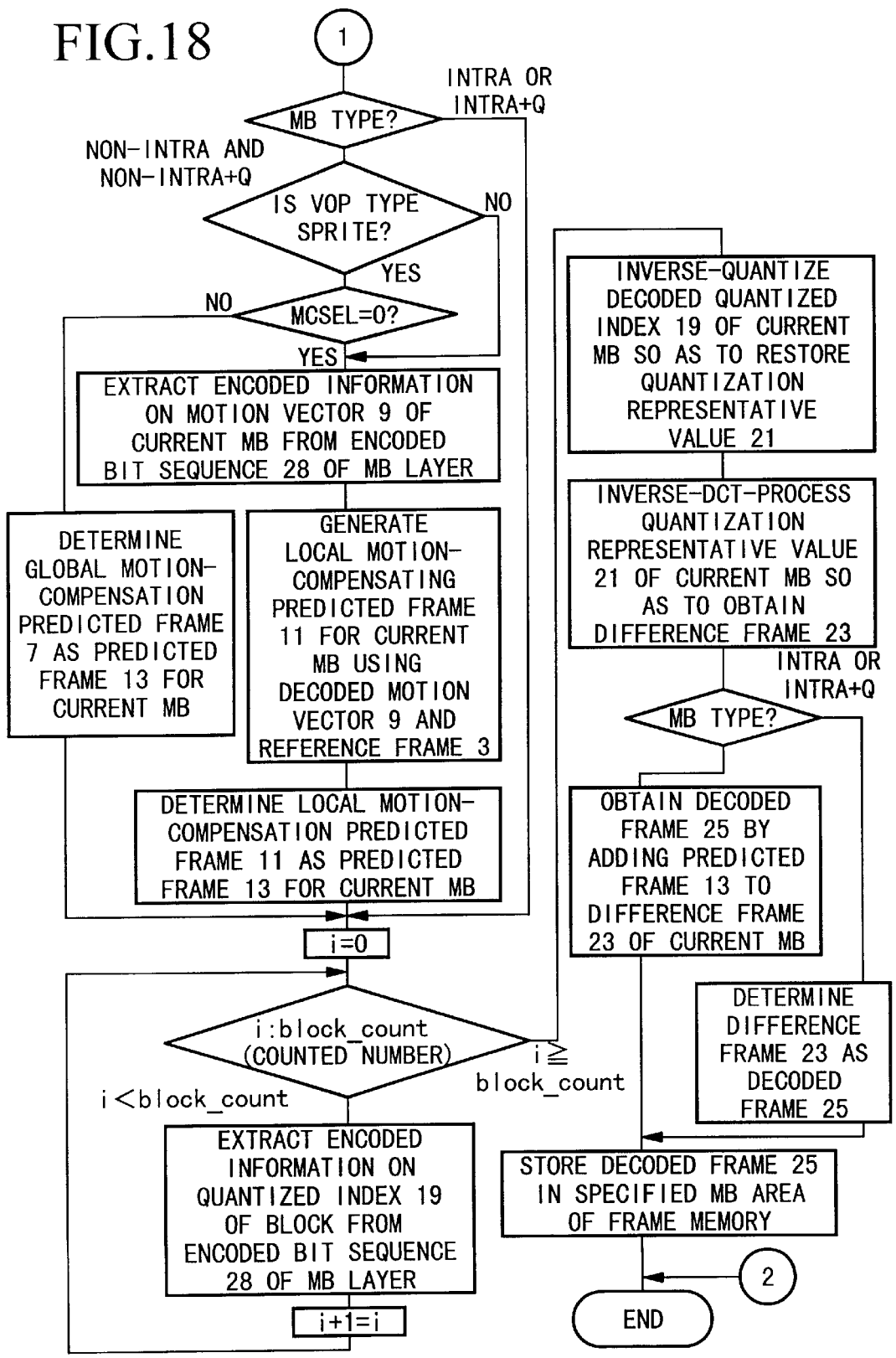
FIG. 18 is a flowchart (2) showing a conventional example of the macroblock layer demultiplexing and decoding operation.

FIGS. 17 and 18 are flowcharts showing a conventional example of the macroblock layer demultiplexing and decoding operation, and "①" and "②" in FIG. 17 respectively indicate that the relevant lines continue to "①" and "②" in FIG. 18.

Figure 19:
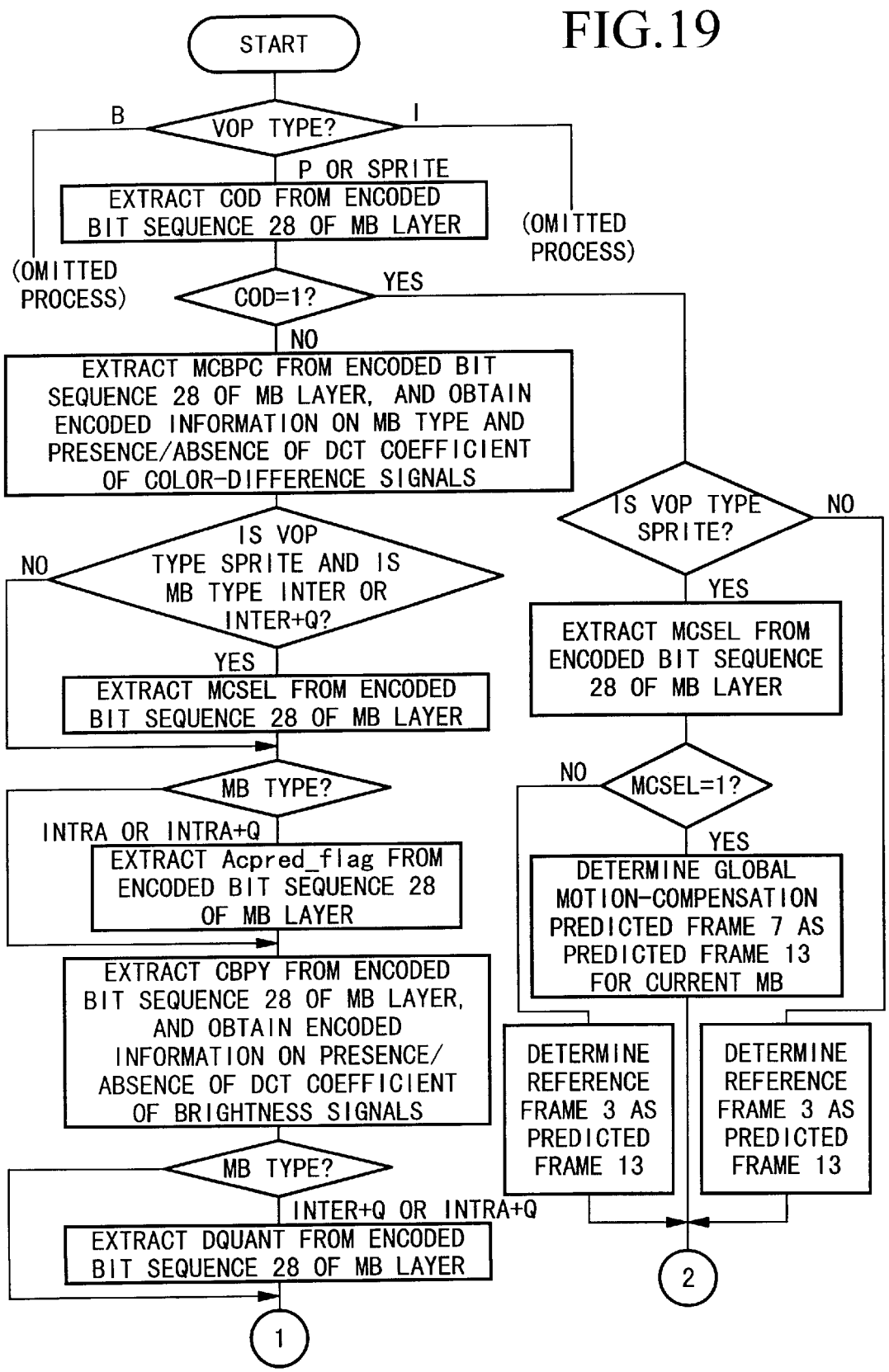
FIG. 19 is a flowchart (1) showing an example of the demultiplexing and decoding operation for a macroblock layer multiplexed using the above first method.
Figure 20:
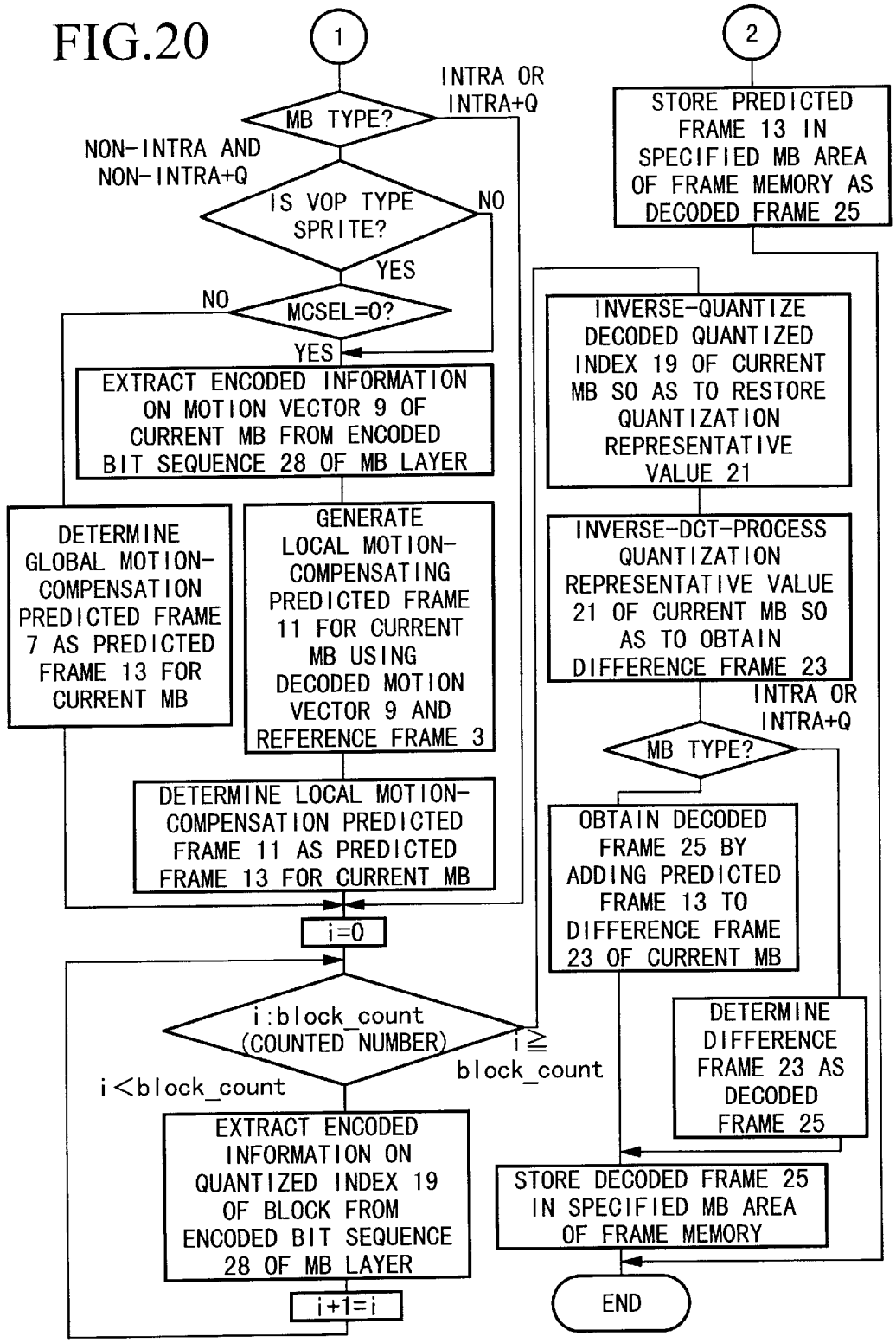
FIG. 20 is a flowchart (2) showing an example of the demultiplexing and decoding operation for a macroblock layer multiplexed using the above first method.

FIGS. 19 and 20 are flowcharts showing an example of the demultiplexing and decoding operation for a macroblock layer multiplexed using the above first method, and "①" and "②" in FIG. 19 respectively indicate that the relevant lines continue to "①" and "②" in FIG. 20.

Figure 21:
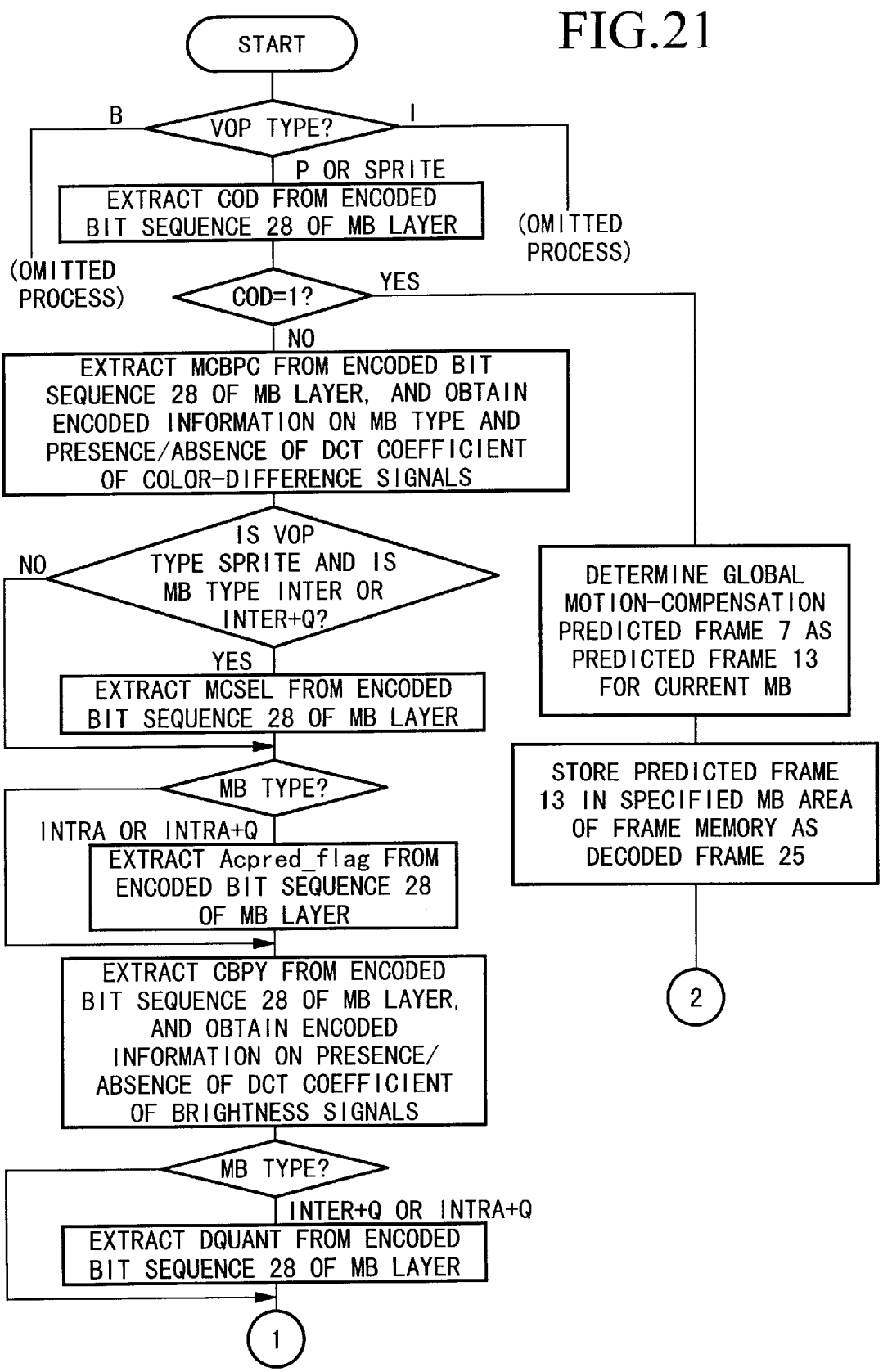
FIG. 21 is a flowchart (1) showing an example of the demultiplexing and decoding operation for a macroblock layer multiplexed using the above second method.
Figure 22:
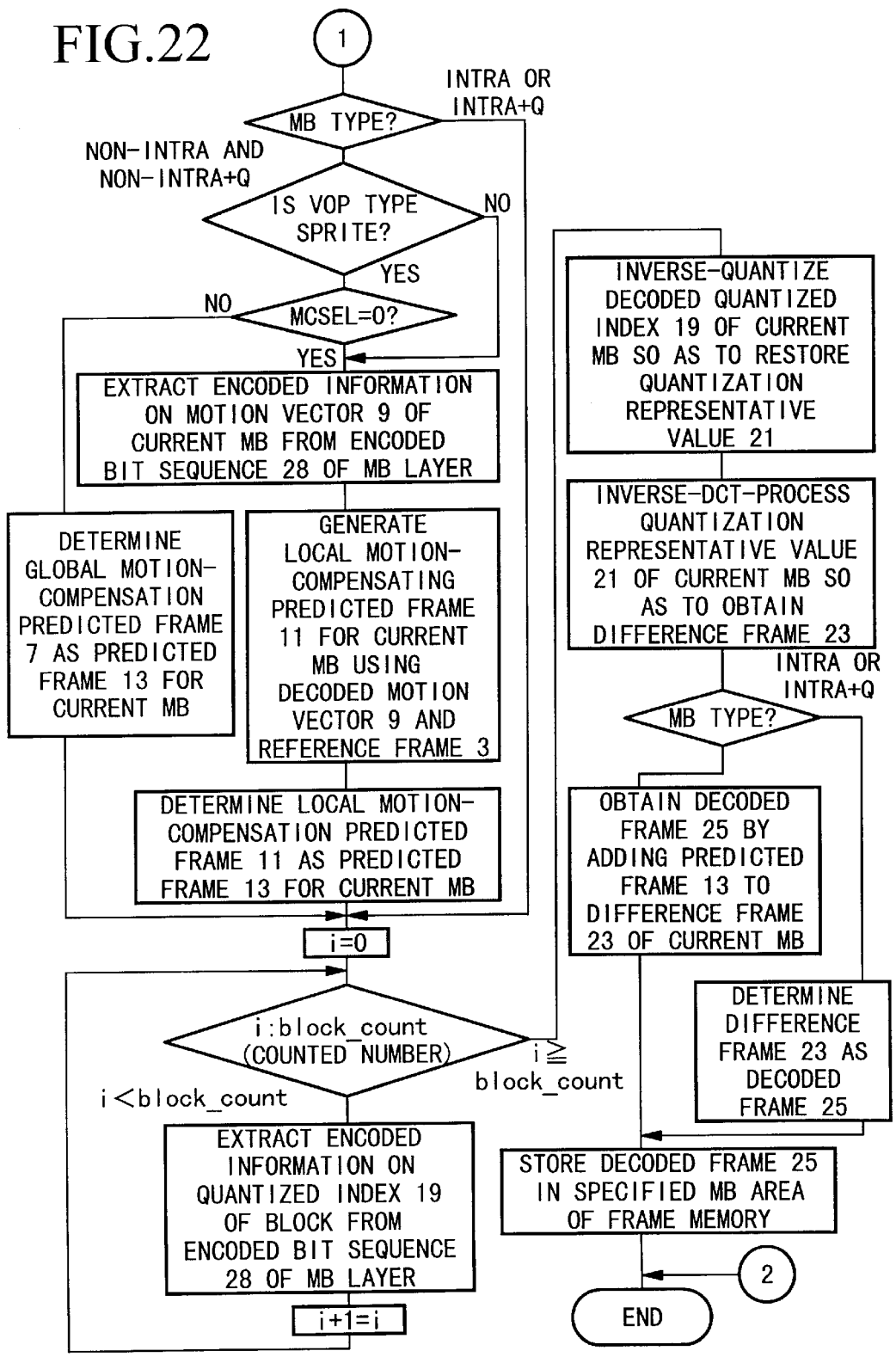
FIG. 22 is a flowchart (2) showing an example of the demultiplexing and decoding operation for a macroblock layer multiplexed using the above second method.

FIGS. 21 and 22 are flowcharts showing an example of the demultiplexing and decoding operation for a macroblock layer multiplexed using the above second method, and "①" and "②" in FIG. 21 respectively indicate that the relevant lines continue to "①" and "②" in FIG. 22.

As respectively shown in FIGS. 19, 20, 21, and 22, a suitable decoding process is determined according to the data structure which was determined when the data were encoded.

What is claimed is:
1. A predictive encoding method of video data, in which one of a global motion-compensating process for predicting a global motion of the whole frame and a local motion-compensating process for predicting a local motion of each block in a frame is selectively performed, wherein:

when a current block to be processed is not block-skipped,
   if the current block is interframe-encoded, then a code word for indicating the prediction mode is inserted in an encoded data sequence of the current block, the code word indicating which of the global and local motion-compensating processes was chosen for interframe-encoding the current block, and the code word inserted after another code word indicating the encoding mode of the current block; and
   if the current block to be processed is intraframe-encoded, then the code word for indicating the prediction mode is not inserted in the data sequence; and
when the current block to be processed is block-skipped, the global motion-compensating process is always chosen so as to perform interframe encoding, and in the skipped block, the code word for indicating the prediction mode is not inserted in the data sequence.

2. A decoding method for decoding a data sequence encoded by a predictive encoding method of video data, in which one of a global motion-compensating process for predicting a global motion of the whole frame and a local motion-compensating process for predicting a local motion of each block in a frame is selectively performed, wherein:
when a current block to be processed has not been block-skipped,
   if the current block was interframe-encoded, then a code word for indicating the prediction mode is extracted from an encoded data sequence of the current block, the code word indicating which of the global and local motion-compensating processes was chosen for interframe-encoding the current block, and a decoding process corresponding to the block which was encoded using the chosen prediction method is performed, where the code word is inserted after another code word, which indicates the encoding mode of the current block, in the data sequence; and
   if the current block was intraframe-encoded, then the code word for indicating the prediction mode is not extracted; and
when the current block has been block-skipped, the code word for indicating the prediction mode is not extracted and a decoding process corresponding to the block which was interframe-encoded by choosing the global motion-compensating process is always performed.

3. A computer-readable medium containing a program which executes a procedure for a predictive encoding method of video data, in which one of a global motion-compensating process for predicting a global motion of the whole frame and a local motion-compensating process for predicting a local motion of each block in a frame is selectively performed, the procedure comprising:
when a current block to be processed is not block-skipped,
   if the current block is interframe-encoded, then a code word for indicating the prediction mode is inserted in an encoded data sequence of the current block, the code word indicating which of the global and local motion-compensating processes was chosen for interframe-encoding the current block, and the code word inserted after another code word indicating the encoding mode of the current block; and
   if the current block to be processed is intraframe-encoded, then the code word for indicating the prediction mode is not inserted in the data sequence; and
when the current block to be processed is block-skipped, the global motion-compensating process is always chosen so as to perform interframe encoding, and in the skipped block, the code word for indicating the prediction mode is not inserted in the data sequence.

4. A computer-readable medium containing a program which executes a procedure for a decoding method for decoding a data sequence encoded by a predictive encoding method of video data, in which one of a global motion-compensating process for predicting a global motion of the whole frame and a local motion-compensating process for predicting a local motion of each block in a frame is selectively performed, the procedure comprising:
when a current block to be processed has not been block-skipped,
   if the current block was interframe-encoded, then a code word for indicating the prediction mode is extracted from an encoded data sequence of the current block, the code word indicating which of the global and local motion-compensating processes was chosen for interframe-encoding the current block, and a decoding process corresponding to the block which was encoded using the chosen prediction method is performed, where the code word is inserted after another code word, which indicates the encoding mode of the current block, in the data sequence;
   if the current block was intraframe-encoded, then the code word for indicating the prediction mode is not extracted; and
when the current block has been block-skipped, the code word for indicating the prediction mode is not extracted and a decoding process corresponding to the block which was interframe-encoded by choosing the global motion-compensating process is always performed.

5. A computer-readable storage medium storing data for a procedure for a predictive encoding method of video data, in which one of a global motion-compensating process for predicting a global motion of the whole frame and a local motion-compensating process for predicting a local motion of each block in a frame is selectively performed, the stored data being encoded in accordance with a procedure comprising:
when a current block to be processed is not block-skipped,
   if the current block is interframe-encoded, then a code word for indicating the prediction mode is inserted in an encoded data sequence of the current block, the code word indicating which of the global and local motion-compensating processes was chosen for interframe-encoding the current block, and the code word inserted after another code word indicating the encoding mode of the current block; and
   if the current block to be processed is intraframe-encoded, then the code word for indicating the prediction mode is not inserted in the data sequence; and
when the current block to be processed is block-skipped, the global motion-compensating process is always chosen so as to perform interframe encoding, and in the skipped block, the code word for indicating the prediction mode is not inserted in the data sequence.

* * * * *